United States Patent
Conklin

(10) Patent No.: US 12,367,715 B2
(45) Date of Patent: Jul. 22, 2025

(54) PREDICTIVE MAINTENANCE PLATFORM

(71) Applicant: Rivian IP Holdings, LLC, Plymouth, MI (US)

(72) Inventor: Christopher R. Conklin, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 168 days.

(21) Appl. No.: 18/077,592

(22) Filed: Dec. 8, 2022

(65) Prior Publication Data

US 2024/0194000 A1  Jun. 13, 2024

(51) Int. Cl.
  G07C 5/00  (2006.01)
  G07C 5/08  (2006.01)
(52) U.S. Cl.
  CPC ............. *G07C 5/006* (2013.01); *G07C 5/008* (2013.01); *G07C 5/0808* (2013.01); *G07C 5/0825* (2013.01)
(58) Field of Classification Search
  CPC ...... G07C 5/006; G07C 5/008; G07C 5/0808; G07C 5/0825
  USPC ...................................................... 701/29.4
  See application file for complete search history.

(56) References Cited

U.S. PATENT DOCUMENTS

| | | | | |
|---|---|---|---|---|
| 2008/0065290 A1* | 3/2008 | Breed | ............ | G01L 17/00 701/31.4 |
| 2012/0150414 A1* | 6/2012 | Huang | ............ | F02D 35/027 701/101 |
| 2017/0084094 A1* | 3/2017 | Worden | ............ | G01N 29/4454 |
| 2022/0198842 A1* | 6/2022 | Agarwal | ............ | G07C 5/0808 |
| 2022/0199107 A1* | 6/2022 | Ueda | ............ | G05B 23/0283 |

FOREIGN PATENT DOCUMENTS

| | | | | |
|---|---|---|---|---|
| CN | 114357614 A | * | 4/2022 | |
| CN | 114624038 A | * | 6/2022 | ............ G01L 5/00 |
| WO | WO-2020067958 A1 | * | 4/2020 | ............ G01D 1/18 |

OTHER PUBLICATIONS

Carfit. (Date Unknown). "Predicting maintenance needs by listening to your car", Revvo technologies.pdfLocated at: https://web.archive.org/web/20220326033937/https://car.fit/en/ Retrieved Oct. 7, 2022, 16 pages.

Revvo. "What is Revvo?", 2022 Revvo Technologies, Inc. located at: https://www.revvo.ai, retrieved Oct. 5, 2022, 18 pages.

* cited by examiner

*Primary Examiner* — Hunter B Lonsberry
*Assistant Examiner* — Helen Li
(74) *Attorney, Agent, or Firm* — BAKERHOSTETLER

(57) ABSTRACT

A method for determining a maintenance schedule for a vehicle may include receiving signals generated by a number of sensors built into specific locations on the vehicle, the number of sensors including a vibration sensor. The method may include identifying one or more indicators of a vibrating component of the vehicle based on features of the generated signals, transmitting information associated with the one or more indicators, and receiving a recommendation for servicing the vehicle. The method may include displaying a notification regarding the recommendation for servicing the vehicle.

20 Claims, 13 Drawing Sheets

PREDICTIVE MAINTENANCE PLATFORM

INTRODUCTION

Vehicle components may experience degradation or wear over time due to wear mechanisms such as vibration or friction. Such components may need servicing or replacing based on the amount of wear.

SUMMARY

Embodiments of the present disclosure are directed to vehicle control systems, methods, and computer readable mediums for tracking vehicle health and determining a maintenance schedule for a vehicle. The systems and methods of the present disclosure can estimate mechanical wear associated with vehicle components based on sensor signals from sensors built into specific locations on the vehicle and can proactively generate recommendations for servicing the vehicle components, thereby reducing vehicle downtime and maintenance costs.

One implementation of the present disclosure is a method for determining a maintenance schedule for a vehicle. In some embodiments, the method includes receiving, by a control module of the vehicle, signals generated by a number of sensors built into specific locations on the vehicle, the number of sensors comprising at least one vibration sensor. In some embodiments, the method includes identifying, by the control module of the vehicle, one or more indicators of a vibrating component of the vehicle based on features of the generated signals. In some embodiments, the method includes transmitting, by a telecommunications module of the vehicle to a vehicle data analysis system, information associated with the one or more indicators. In some embodiments, the method includes receiving, by the telecommunications module of the vehicle from the vehicle data analysis system, a recommendation for servicing the vehicle. In some embodiments, the recommendation is based on a prediction related to the one or more indicators. In some embodiments, the prediction is identified by the vehicle data analysis system using a machine learning (ML) model trained to predict component failures using historical vehicle service data. In some embodiments, the method includes displaying, by a user interface module of the vehicle, a notification regarding the recommendation for servicing the vehicle.

In some embodiments, identifying the one or more indicators includes determining, by the control module of the vehicle, a measurement of damage associated with the vibrating component. In some embodiments, determining the measurement of damage includes applying, by the control module of the vehicle, a transfer function to at least a portion of the generated signals to determine a measurement of force associated with the vibrating component and determining, by the control module of the vehicle, a measurement of fatigue cycles associated with the vibrating component based on the measurement of force. In some embodiments, transmitting the information associated with the one or more indicators includes transmitting the measurement of fatigue cycles associated with the vibrating component. In some embodiments, the method includes aggregating, by the control module of the vehicle, the measurement of fatigue cycles associated with the vibrating component over time to generate an aggregate measurement of fatigue cycles associated with the vibrating component, comparing, by the control module of the vehicle, the aggregate measurement of fatigue cycles associated with the vibrating component to a threshold, and transmitting, by the telecommunications module to the vehicle data analysis system, the information based on the comparison.

In some embodiments, the method includes tracking, by the control module of the vehicle, the measurement of damage associated with the vibrating component over time to generate a trend of damage associated with the vibrating component, identifying, by the control module of the vehicle, a change in a rate of mechanical wear associated with the vibrating component based on the trend, and transmitting, by the telecommunications module to the vehicle data analysis system, the information based on identifying the change in the rate of mechanical wear. In some embodiments, identifying the one or more indicators includes mapping a feature of a frequency domain representation of at least a portion of the signals to the vibrating component. In some embodiments, displaying the notification includes displaying an indication of the vibrating component. In some embodiments, the number of sensors include a microphone. In some embodiments, receiving the signals includes receiving microphone data. In some embodiments, identifying the one or more indicators includes mapping a feature of an audio signature of the microphone data to the vibrating component.

Another implementation of the present disclosure is a vehicle system for determining a maintenance schedule for a vehicle including a vibration sensor built into a specific location on the vehicle, a display, and one or more computing devices. In some embodiments, the one or more computing devices include one or more non-transitory computer-readable storage media including instructions and one or more processors coupled to the one or more storage media. In some embodiments, the one or more processors are configured to execute the instructions to receive signals generated by the vibration sensor, identify one or more indicators of a vibrating component of the vehicle based on features of the generated signals, transmit to a vehicle data analysis system information associated with the one or more indicators, and receive from the vehicle data analysis system a recommendation for servicing the vehicle. In some embodiments, the recommendation is based on a prediction related to the one or more indicators and is identified by the vehicle data analysis system using a machine learning (ML) model trained to predict component failures using historical vehicle service data. In some embodiments, the one or more processors are configured to execute the instructions to display, via the display, a notification regarding the recommendation for servicing the vehicle.

In some embodiments, identifying the one or more indicators includes determining a measurement of damage associated with the vibrating component. In some embodiments, determining the measurement of damage includes applying a transfer function to at least a portion of the generated signals to determine a measurement of force associated with the vibrating component and determining a measurement of fatigue cycles associated with the vibrating component based on the measurement of force. In some embodiments, transmitting the information associated with the one or more indicators includes transmitting the measurement of fatigue cycles associated with the vibrating component. In some embodiments, the instructions cause the one or more processors to aggregate the measurement of fatigue cycles associated with the vibrating component over time to generate an aggregate measurement of fatigue cycles associated with the vibrating component, compare the aggregate measurement of fatigue cycles associated with the vibrating component to a threshold, and transmit to the vehicle data analysis system the information based on the comparison.

In some embodiments, the instructions cause the one or more processors to track the measurement of damage associated with the vibrating component over time to generate a trend of damage associated with the vibrating component, identify a change in a rate of mechanical wear associated with the vibrating component based on the trend, and transmit to the vehicle data analysis system the information based on identifying the change in the rate of mechanical wear. In some embodiments, identifying the one or more indicators includes mapping a feature of a frequency domain representation of at least a portion of the signals to the vibrating component. In some embodiments, displaying the notification includes displaying an indication of the vibrating component. In some embodiments, the vehicle system includes a microphone. In some embodiments, receiving the signals includes receiving microphone data. In some embodiments, identifying the one or more indicators includes mapping a feature of an audio signature of the microphone data to the vibrating component.

Another implementation of the present disclosure is a non-transitory computer-readable medium including instructions. In some embodiments, when executed by one or more processors of one or more computing devices, the instructions cause the one or more processors to receive signals generated by a vibration sensor built into a specific location on a vehicle, identify one or more indicators of a vibrating component of the vehicle based on features of the generated signals, transmit to a vehicle data analysis system information associated with the one or more indicators, and receive from the vehicle data analysis system a recommendation for servicing the vehicle. In some embodiments, the recommendation is based on a prediction related to the one or more indicators and is identified by the vehicle data analysis system using a machine learning (ML) model trained to predict component failures using historical vehicle service data. In some embodiments, the instructions cause the one or more processors to display, via a display of the vehicle, a notification regarding the recommendation for servicing the vehicle.

Another implementation of the present disclosure is a method for determining a maintenance schedule for a vehicle. In some embodiments, the method includes receiving, by one or more servers associated with a vehicle data analysis system, information related to signals generated by a number of sensors built into specific locations on the vehicle. In some embodiments, the sensors include at least one vibration sensor. In some embodiments, the method includes identifying, by the one or more servers, one or more indicators of a vibrating component of the vehicle based on features of the generated signals, predicting, by the one or more servers based on the one or more indicators, possible failure of at least one component of the vehicle, and storing, by the one or more servers, a recommendation for servicing the vehicle. In some embodiments, the recommendation is based on the predicted possible failure. In some embodiments, the method includes transmitting, by the one or more servers to the vehicle, a notification regarding the recommendation.

In some embodiments, identifying the one or more indicators includes applying, by the one or more servers, a transfer function to at least a portion of the information related to the signals to determine a measurement of force associated with the vibrating component, determining, by the one or more servers, a measurement of fatigue cycles associated with the vibrating component based on the measurement of force, and storing, by the one or more servers, the measurement of fatigue cycles. In some embodiments, predicting the possible failure includes comparing, by the one or more servers, the stored measurement of fatigue cycles to a threshold and predicting, by the one or more servers, the possible failure based on the comparison. In some embodiments, the method includes scheduling, by the one or more servers, a service appointment with a service provider based on the predicted possible failure.

In some embodiments, scheduling the service appointment includes transmitting, by the one or more servers to the vehicle, appointment information associated with the scheduled service appointment. In some embodiments, identifying the one or more indicators includes mapping, by the one or more servers, a feature of a frequency domain representation of at least a portion of the generated signals to the vibrating component. In some embodiments, transmitting the notification includes transmitting, by the one or more servers, an indicator of the at least one component associated with the predicted possible failure. In some embodiments, the method includes generating, by the one or more servers, the recommendation using a machine learning (ML) model trained to predict component failures using historical vehicle service data.

Another implementation of the present disclosure is a computing system for determining a maintenance schedule for a vehicle. In some embodiments, the computing system includes one or more servers including one or more non-transitory computer-readable storage media having instructions stored thereon. In some embodiments, the computing system includes one or more processors coupled to the one or more storage media. In some embodiments, the one or more processors are configured to execute the instructions to receive information related to signals generated by a number of sensors built into specific locations on the vehicle. In some embodiments, the sensors include least one vibration sensor. In some embodiments, the instructions cause the one or more processors to identify one or more indicators of a vibrating component of the vehicle based on features of the generated signals, predict, based on the one or more indicators, possible failure of at least one component of the vehicle, and store a recommendation for servicing the vehicle. In some embodiments, the recommendation is based on the predicted possible failure. In some embodiments, the one or more processors are configured to execute the instructions to transmit to the vehicle a notification regarding the recommendation.

In some embodiments, identifying the one or more indicators includes applying a transfer function to at least a portion of the information related to the signals to determine a measurement of force associated with the vibrating component, determining a measurement of fatigue cycles associated with the vibrating component based on the measurement of force, and storing the measurement of fatigue cycles. In some embodiments, predicting the possible failure includes comparing the stored measurement of fatigue cycles to a threshold and predicting the possible failure based on the comparison. In some embodiments, the method includes scheduling a service appointment with a service provider based on the predicted possible failure. In some embodiments, scheduling the service appointment includes transmitting appointment information associated with the scheduled service appointment. In some embodiments, identifying the one or more indicators includes mapping a feature of a frequency domain representation of at least a portion of the generated signals to the vibrating component.

In some embodiments, transmitting the notification includes transmitting an indicator of the at least one component associated with the predicted possible failure. In some embodiments, the one or more processors are configured to execute the instructions to generate the recommendation using a machine learning (ML) model trained to predict component failures using historical vehicle service data.

Another implementation of the present disclosure is a non-transitory computer-readable medium including instructions. In some embodiments, when executed by one or more processors of one or more computing devices, the instructions cause the one or more processors to receive information related to signals generated by a number of sensors built into specific locations on a vehicle. In some embodiments, the sensors include a vibration sensor. In some embodiments, the instructions cause the one or more processors to identify one or more indicators of a vibrating component of the vehicle based on features of the generated signals, predict, based on the one or more indicators, possible failure of at least one component of the vehicle, and store a recommendation for servicing the vehicle. In some embodiments, the recommendation is based on the predicted possible failure. In some embodiments, the instructions cause the one or more processors to transmit, to the vehicle, a notification regarding the recommendation.

In some embodiments, identifying the one or more indicators includes applying a transfer function to at least a portion of the information related to the signals to determine a measurement of force associated with the vibrating component, determining a measurement of fatigue cycles associated with the vibrating component based on the measurement of force, and storing the measurement of fatigue cycles. In some embodiments, predicting the possible failure includes comparing the stored measurement of fatigue cycles to a threshold and predicting the possible failure based on the comparison. In some embodiments, the instructions cause the one or more processors to schedule a service appointment with a service provider based on the predicted possible failure.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Example embodiments of a vehicle monitoring platform as described herein may enable a data-driven vehicle maintenance schedule based on what is uniquely known about each individual vehicle through on-board signal monitoring and analysis. Vehicles may be fitted with a number of high-bandwidth tri-axial accelerometers to assist with monitoring for mechanical wear. The information from the accelerometers may be integrated with other signals generated by the vehicle inside a module on board the vehicle to allow for real-time, synchronous processing to provide an indication of the vehicle's need for service. The signals may be processed using a combination of artificial intelligence (AI) and physics-based algorithms that compute various health indicator metrics for specific vehicle subsystems. These computed metrics may subsequently be stored in a cloud-based vehicle ledger. Trend analysis may also be performed on the health metrics, which may help to reveal any potential areas of concern, and potentially to generate appropriate response actions.

DESCRIPTION OF EXAMPLE EMBODIMENTS

Figure 1:
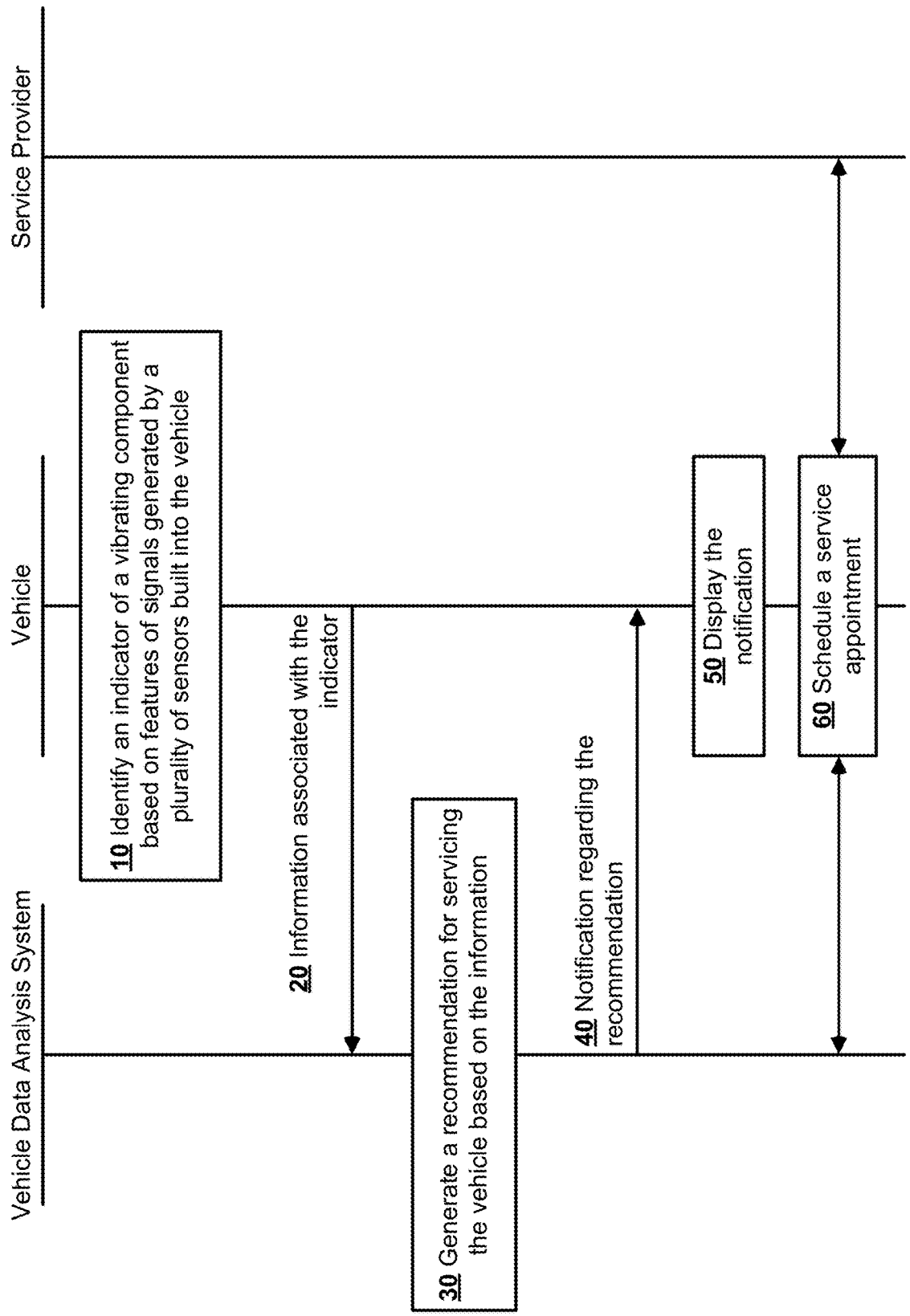
FIG. 1 illustrates an example of generating a recommendation for servicing a vehicle and scheduling a service appointment based on the recommendation.

Embodiments of the present disclosure are directed towards vehicle control systems, methods, and computer readable mediums for tracking vehicle health and determining a maintenance schedule for a vehicle. Specifically, systems and methods of the present disclosure enable a data-driven vehicle maintenance schedule based on what is uniquely known about each individual vehicle through on-board signal monitoring and analysis. Vehicles may be fitted with a number of high-bandwidth tri-axial accelerometers to facilitate monitoring for mechanical wear. The information from the accelerometers may be integrated with other signals generated by the vehicle inside a module on board the vehicle to allow for real-time, synchronous processing to provide an indication of the vehicle's need for service. The signals may be processed using a combination of artificial intelligence (AI) and physics-based algorithms that compute various health metrics for specific vehicle subsystems. These computed metrics may subsequently be stored in a cloud-based vehicle ledger. Trend analysis may also be performed on the health metrics, which may help to reveal any potential areas of concern, and potentially to generate appropriate response actions. Trend analysis may include determining a rate of wear accumulation. For example, the platform may generate a recommendation to service a component based on identifying an increase in a rate of wear associated with the component (or another associated component).

Wear mechanisms create unique noise and vibration signatures. Measuring these signals alongside other vehicle signals, interpreting them, and then trending them may provide an indication of that individual vehicle's need for service and may be useful for other applications. One example may be in an end-of-line audit as an in-vehicle application where it may be used for quality audit tests on vehicles exiting assembly. Particular embodiments may serve as the interface to record error states and promote usage of data over subjective evaluation. An embodiment may provide the ability to measure data on any vehicle without the need for extensive instrumentation. That data may then be uploaded to the cloud containing automated data processing to search for error states. Alternatively, the platform may aid service technicians in diagnosis of customer concerns, allowing a data-driven approach to diagnosis, which may in turn mitigate turnaround times at service centers. Further, various embodiments may run behind the scenes while a vehicle is being driven by a customer, making routine evaluations and sending health information back to the cloud.

Speaking now generally, the platform may collect a number of signals from sensors embedded in a vehicle. In some embodiments, an on-board module receives the signals. Additionally or alternatively, a cloud-based data processing system (e.g., a vehicle data analysis system, etc.) may receive the signals. For example, the on-board module may receive a first set of signals and perform a first type of analysis (e.g., physics-based analysis, etc.) on the first set of signals and a cloud-based data processing system may receive a second set of signals and perform a second type of analysis (e.g., AI-based analysis, etc.) on the second set of signals. The signals may be associated with a health of the vehicle/vehicle components (e.g., vibration data, microphone data, data describing torque applied to a component of the vehicle, etc.), a user's operation of the vehicle (e.g., steering angle data, throttle/brake pedal apply data, wheel speed data, drive unit speed/torque data, etc.), and/or an environmental context of the vehicle (e.g., ambient temperature data, data describing a following distance of the vehicle, data describing characteristics of a road surface the vehicle is traveling on, etc.).

In various embodiments, the on-board module and/or the cloud-based data processing system analyze the signals (or a subset thereof) to generate subsequent information (e.g., health metrics, error states, recommendations, etc.). For example, the on-board module may analyze vibration data and/or microphone data to generate one or more health metrics associated with the vehicle and/or vehicle components. In various embodiments, the health metrics include a measurement of wear such as vibration-based wear and/or strain-based wear. For example, the on-board module may apply a transfer function to vibration data to determine strain at a component and may compute an accrued rainflow matrix using the strain at the component to generate a measurement of strain-based wear for the component. In various embodiments, the on-board module and/or the cloud-based data processing system update a database with the one or more health metrics. For example, the on-board module may compute strain-based wear associated with a component of a vehicle accumulated over a 24-hour period and may update a database entry associated with the vehicle to include the accumulated strain-based wear. The database may store various metrics associated with a vehicle, a fleet of vehicles, and/or the like. For example, the database may include a ledger listing a number of components associated with a vehicle and a measurement of wear associated with each of the components. In various embodiments, the cloud-based data processing system and/or the on-board module compute derived metrics using the various metrics stored in the database. For example, the cloud-based data processing system may generate an average measurement of wear associated with a vehicle based on computing an average of a number of component-specific wear metrics corresponding to the vehicle. As another example, the cloud-based data processing system may perform a regression analysis using a number of health metrics corresponding to a fleet of vehicles to identify a common failure mode of the fleet of vehicles (e.g., a spline threading that consistently goes out of alignment, etc.). As another example, the on-board module may compare a measurement of wear associated with each component of a vehicle to a threshold corresponding to each component to identify components in need of service. In some embodiments, the database stores raw sensor data from one or more vehicles.

In some embodiments, the on-board module and/or cloud-based data processing system analyze vibration data and/or microphone data to diagnose one or more concerns associated with a vehicle and/or vehicle component. In various embodiments, the concerns may include brake squeal, excess wind noise (e.g., mirror whistle, etc.), excess road noise, HVAC health, an AC compressor fault, an out-of-balance rotor, drive unit bushing deterioration, chassis bushing deterioration, brake rotor thickness variation, excessive brake pad wear, wheel/tire imbalance, chassis damper leaks/failures, chassis misalignment, tire wear, gear/bearing failures (e.g., a wheel bearing failure, etc.), a halfshaft fracture, a CV joint fracture, and/or the like. For example, the on-board module may compute a Fast-Fourier Transform (FFT) of vibration data with respect to a rotational speed of a drive unit of a vehicle and may diagnose an AC compressor fault based on identifying a frequency signature in the FFT associated with an AC compressor fault. In some embodiments, the platform maintains a database including a number of frequency signatures corresponding to various concerns/error states.

In some embodiments, the on-board module may transmit sensor data and/or information derived therefrom to an external system such as a service provider computing system and/or an insurance provider computing system. For example, the on-board module may receive a request from a service provider computing system for data to facilitate diagnosing a concern with the vehicle corresponding to an upcoming service appointment and in response the on-board module may transmit vibration data (e.g., tri-axial accelerometer data, etc.) to the service provider computing system.

In various embodiments, the platform (e.g., the cloud-based data processing system and/or the on-board module, etc.) proactively generates recommendations based on correlating stored health metrics with other data. For example, the platform may correlate a user's driving pattern with trends in component wear to generate suggestions for the user on how to adjust their driving to reduce further wear on the vehicle. As another example, the platform may correlate trends in component wear with location data to identify portions of road associated with accelerated wear on the vehicle (e.g., due to potholes, a rough road surface, an excess of speed bumps, etc.) and may generate routing recommendations to avoid such portions (e.g., by using a different road, using a different lane, etc.). As another example, the platform may analyze vehicle health metrics to proactively generate recommendations for servicing the vehicle before a component failure occurs (e.g., a brake pad wears out, a component cracks, a brake line requires bleeding, etc.) and may automatically schedule a service appointment based on the recommendation. In some embodiments, the platform may integrate with external systems such as a service system to automatically schedule service and/or facilitate resource allocation by transmitting information associated with the type of recommended service (e.g., wheel alignment, brake caliper replacement, etc.) and/or any parts associated with the recommended service. The service provider may use this information to prepare for the service appointment (e.g., to order parts, schedule technicians with the required skills, etc.), thereby reducing service delays and increasing service throughput.

In various embodiments, the platform enables data-driven design and development of new vehicles/components. For example, the platform may analyze vehicle usage data and/or historic health metrics to determine how customers use their vehicles (e.g., how many off-road miles, how many highway miles, etc.) rather than designers assuming this information. Additionally, the platform may analyze previous designs using historic health metrics to identify improvements for future designs. For example, the platform may analyze historic health metrics to determine that a vehicle component cracks in a specific location and designers may design a new component with increased strength in the specific location.

Turning now to FIG. 1, an example of generating a recommendation for servicing a vehicle and scheduling a service appointment based on the recommendation is shown, according to an exemplary embodiment. At step 10, a vehicle (e.g., an on-board module, etc.) may identify an indicator of a vibrating component based on features of signals generated by a plurality of sensors built into the vehicle. For example, the vehicle may analyze vibration data from a number of vibration sensors embedded in the vehicle to identify a frequency signature associated with a specific component of the vehicle (e.g., a specific gear of a drive unit, etc.). In some embodiments, an indicator (e.g., a vibration signature, etc.) of a component is identified by analyzing a cepstrum of vibration signals taken with respect to a rotational speed of a drive unit of the vehicle. Additionally or alternatively, the indicator may be identified using an AI model such as a convolutional neural network (CNN) auto-encoder. In various embodiments, the AI model is trained using historical operational data. For example, a CNN model may be trained using operation data including vibration signals labeled with an error state that they correspond to. In various embodiments, the AI model is updated using subsequent sensor data. For example, a CNN model may be continuously updated using vibration data from a number of vehicles in a fleet. The indicator may be associated with wear on the vibrating component.

In various embodiments, step 10 includes correlating signals from a number of sensors to identify the indicator. For example, the vehicle may identify a vibrating strut based on identifying a first frequency signature from FFT of signals from a first vibration sensor and identifying a second frequency signature from a FFT of signals from a second vibration sensor (wherein the first and second frequency signatures are correlated with the vibrating strut). Step 10 may include performing frequency analysis such as applying a peak picking filter to a cepstrum of vibration data taken with respect to a rotational speed of a drive unit. In some embodiments, step 10 includes computing wear associated with the vibrating component based on the signals. For example, the vehicle may compute a temporal rainflow matrix using the signals to assess temporal wear on the vibrating component. In some embodiments, the indicator is associated with a specific failure mode of the vibrating component. For example, step 10 may include differentiating between a damaged spline threading and a low-oil failure mode associated with a drive unit based on a vibration signature.

At step 20, the vehicle may transmit information associated with the indicator to a vehicle data analysis system (e.g., a cloud-based data processing system, etc.). For example, the vehicle may transmit a measurement of wear associated with the vibrating component. Additionally or alternatively, the information may include raw signal data from one or more of the plurality of sensors. For example, the vehicle may transmit raw signal data from a number of vibration sensors to the vehicle data analysis system for use in a machine learning (ML) model. The vehicle data analysis system may include one or more cloud-based data processing systems/servers that receive and analyze data from a number of vehicles.

At step 30, the vehicle data analysis system may generate a recommendation for servicing the vehicle based on the information. In various embodiments, the vehicle data analysis system generates the recommendation using a ML model trained to predict component failures using historical vehicle service data. For example, the vehicle data analysis system may execute a CNN auto-encoder model trained using a corpus of sensor signals collected during operation of a number of vehicles. Additionally or alternatively, the vehicle data analysis system may generate the recommendation using one or more physics-based models. For example, the vehicle data analysis system may compute an accrued rainflow matrix using a measurement of temporal wear received from the vehicle to determine aggregate wear associated with the vehicle and/or a vehicle component and may compare the aggregate wear to a threshold to determine whether the vehicle and/or vehicle component are in need of service. In various embodiments, the recommendation may identify a specific component of the vehicle. For example, the recommendation may identify a specific gear of a drive unit in need of service (e.g., based on an aggregate wear associated with the gear exceeding a threshold, etc.). Additionally or alternatively, the recommendation may identify a specific failure mode associated with a component. For example, the vehicle data analysis system may generate a recommendation to repair a crack in a specific portion of a component of the vehicle.

At step 40, the vehicle data analysis system may transmit a notification regarding the recommendation. For example, the vehicle data analysis system may transmit information to cause the vehicle to display a graphical user interface (GUI) indicating that service is recommended for a specific component. In various embodiments, the notification includes service information such as an estimated time required to perform a repair, an estimated cost of a repair, available appointment slots at service providers nearby, and/or the like.

At step 50, the vehicle may display the notification. For example, the vehicle may display a GUI recommending service for a specific component and allowing a user to choose from a number of available service appointments. At step 60, a service appointment is scheduled. In various embodiments, step 60 includes querying a service provider with information associated with the recommended service (e.g., a type of service, components needed, etc.) to retrieve one or more available time slots. For example, the vehicle data analysis system may query the service provider for available time slots for a rear-left brake rotor replacement (e.g., specifying any parts required) and the service provider may return a list of available time slots corresponding to when a technician capable of performing the replacement and the required parts are available. In various embodiments, step 60 includes displaying a number of available time slots to a user of the vehicle, receiving a selection from the user of a specific time slot, and/or automatically scheduling a service appointment based on the user selection.

Figure 2:
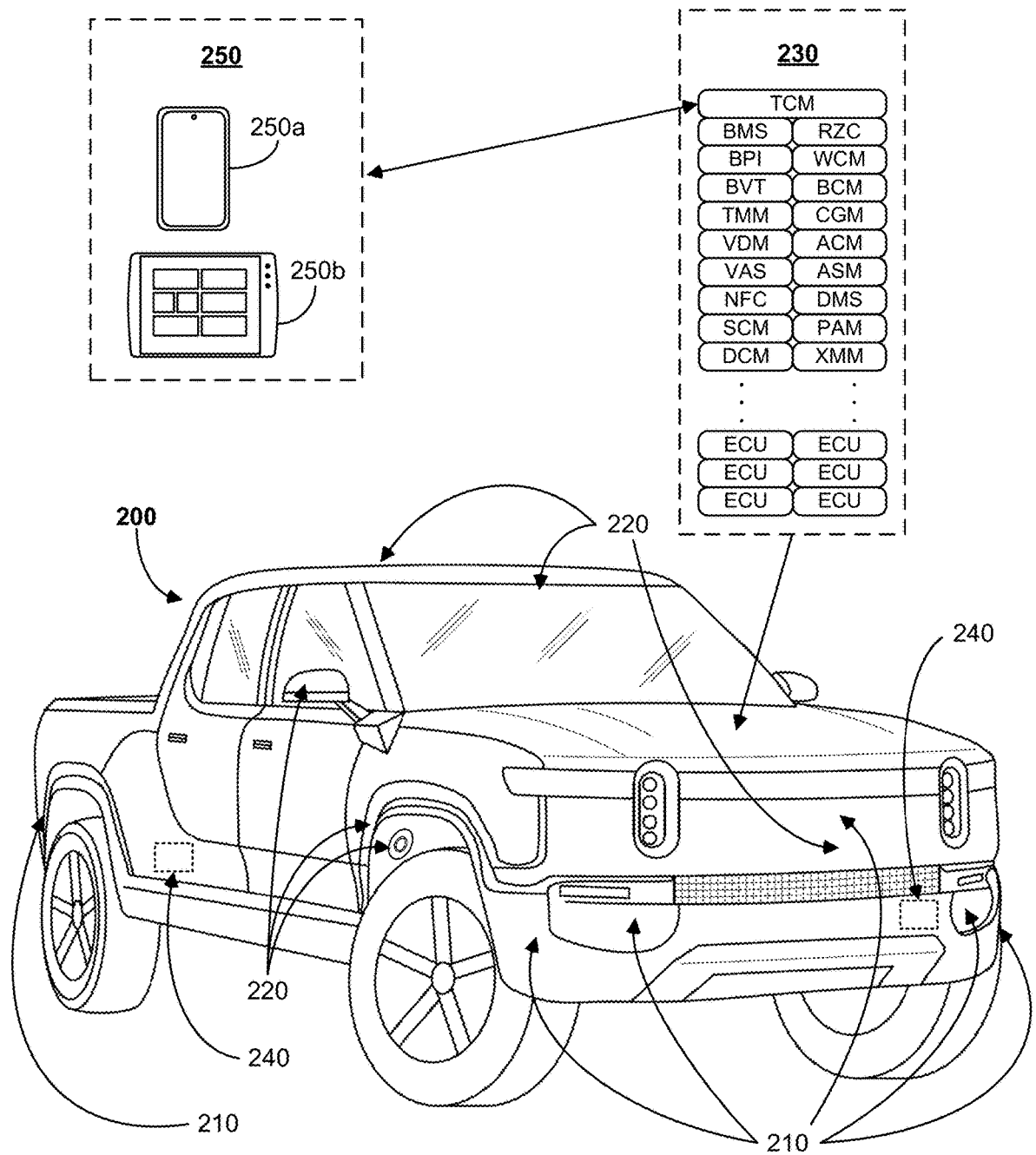
FIG. 2 illustrates an example vehicle with example sensors for measuring vehicle wear.

FIG. 2 illustrates an example vehicle 200 with example sensors for measuring vehicle wear. Vehicle 200 may include multiple sensors 210, multiple cameras 220, and a control system 230. In some embodiments, vehicle 200 may be able to pair with a computing device 250 (e.g., smartphone 250*a*, tablet computing device 250*b*, or a smart vehicle accessory). As an example and not by way of limitation, a sensor 210 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. For example, sensors 210 may include a GPS sensor, a microphone, a steering angle sensor, an ambient temperature sensor, an environmental condition sensor (e.g., detecting rain, snow, fog, etc.), a throttle sensor, a brake pedal apply sensor, an inertial measurement sensor, an accelerometer, a wheel speed sensor, and/or a drive unit speed/torque sensor.

In various embodiments, vehicle 200 includes vibration sensors 240. Vibration sensors 240 may be accelerometers connected to a high bandwidth, bidirectional, digital audio bus on an in-vehicle module. A specific example may be to connect vibration sensors 240 to an A2B-2 bus on the module used for infotainment display and audio. The in-vehicle module may transmit the accelerometer data via a wired connection to a second in-vehicle module which in turn transmits wirelessly to the cloud. Using the previous example, the infotainment module may transmit the accelerometer data via Ethernet to a telematics control module that controls the wireless vehicle communication gateway and over-the-air (OTA) communication between the vehicle and a corresponding cloud. Once the telematics module receives the accelerometer data, it may send that data wirelessly to the cloud.

In various embodiments, vibration sensors 240 are placed in specific portions of vehicle 200. For example, vibration sensors 240 may be placed on the front of vehicle 200 in order to generate an estimate of the accumulated wear on the front component of vehicle 200 and to determine if a crack may be present on the component. In various embodiments, vibration sensors 240 may be added to the front drive unit in order to mitigate reliability concerns. A number of techniques may be applied to the signal data from vibration sensors 240 to estimate the vibrations that are accumulating on the vehicle components (e.g., tires, struts, drive unit gears, etc.). The estimate of accumulated vibrations may indicate wear on the vehicle components and may correlate with vehicle health and the need for maintenance. In various embodiments, vibration sensors 240 are positioned in a first location on vehicle 200 and are used to measure vibrations associated with a component at a second location on vehicle 200 remote from the first location. For example, a vibration sensor 240 may be positioned on a component of vehicle 200 and may generate a measurement of vibrations at a wheel of vehicle 200 using a transfer function. Analysis of signal data is described in greater detail below.

As an example and not by way of limitation, a camera 220 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 200 may include various controllable components (e.g., doors, seats, windows, lights, HVAC, entertainment system, security system), instrument and information displays and/or interactive interfaces, functionality to pair a computing device 250 with the vehicle (which may enable control of certain vehicle functions using the computing device 250), and functionality to pair accessories with the vehicle, which may then be controllable through an interactive interface in the vehicle or through a paired computing device 250. In some embodiments, vehicle 200 includes one or more cameras 220 positioned in a wheel-well of vehicle 200. For example, vehicle 200 may include a number of cameras positioned in a wheel-well to monitor a tire of vehicle 200 to generate an estimate of tire wear (e.g., determine a tread depth from image data, etc.).

Control system 230 may enable control of various systems on-board the vehicle. As shown in FIG. 2, control system 230 may comprise one or more electronic control units (ECUs), each of which are dedicated to a specific set of functions. Each ECU may be a computer system (as described further in FIGS. 13A and 13B), and each ECU may include functionality provide by one or more of the example ECUs described below.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 250, in-vehicle navigation, vehicle-to-vehicle communication, communication between the vehicle and landscape features (e.g., automated toll road sensors, automated toll gates, power dispensers at charging stations), or automated calling functionality. In various embodiments, the TCM ECU transmits information associated with a health of vehicle 200 and/or components of vehicle 200. For example, the TCM ECU may transmit raw sensor data from vibrations sensors 240 to a cloud processing system such as the vehicle data analysis system described with reference to FIG. 1. As another example, the TCM ECU may transmit a measurement of temporal wear (e.g., a number of fatigue cycles accumulated over 15 minutes of operation, etc.) associated with a vehicle component to a vehicle data analysis system. In some embodiments, the TCM ECU transmits additional information associated with operation of vehicle 200. For example, the TCM ECU may transmit a location associated with a road characteristic identified by vehicle 200. As another example, the TCM ECU may transmit one or more driving characteristics (e.g., average following distance, percentage of time over the speed limit, etc.) associated with a driving pattern of a user of vehicle 200. In various embodiments, the TCM ECU computes additional information such as component wear based on received signals from sensors such as sensors 210 and/or vibration sensors 240. For example, the TCM ECU may include a diagnostics feature to compute wear associated with a vehicle component using a rainflow matrix.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s). In various embodiments, the CGM ECU collects sensor signals from one or more sensors of vehicle 200. For example, the CGM ECU may collect vibration signals from vibration sensors 240 for transmittal to a remote processing system via the TCM ECU. As another example, the CGM ECU may collect information about a road surface vehicle 200 travels on. For example, the CGM ECU may collect vibration signals associated with traversing a route and may associate location data (e.g., a GPS position, etc.) with the vibration signals. In various embodiments, the CGM ECU collects signals associated with a user's operation of vehicle 200. For example, the CGM ECU may record any hard stopping events, the following distance of vehicle 200 behind other vehicles, measurements of torque on a component of vehicle 200 based on hard-cornering events, and/or the like.

Vehicle 200 may include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 200 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data from vibration sensors 240 to the TCM ECU (e.g., via Ethernet, etc.). Additionally or alternatively, the XMM ECU may transmit other data (e.g., sound data from a number of microphones, etc.) to the TCM ECU.

Figure 3:
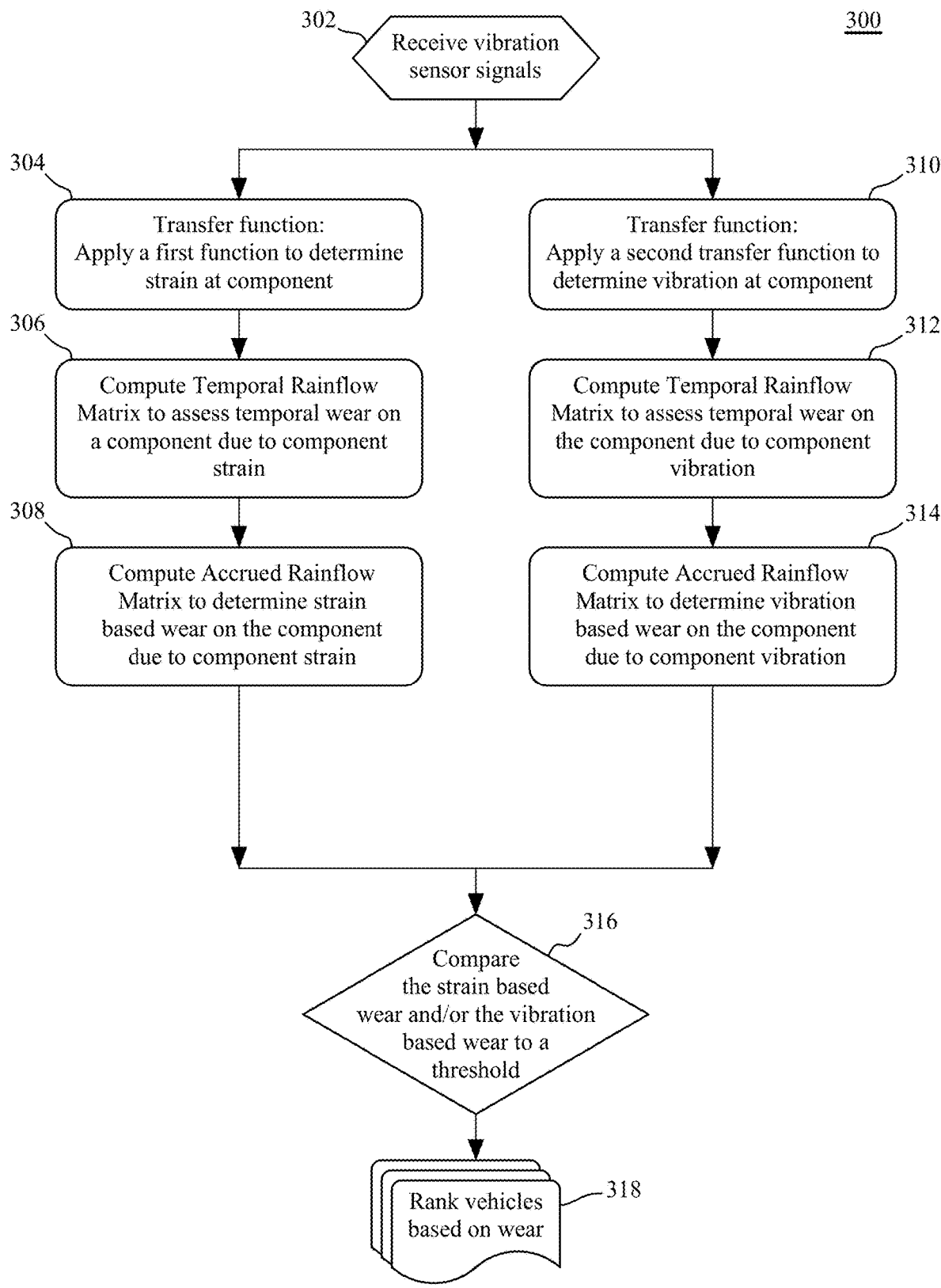
FIG. 3 is a flowchart illustrating a method of computing wear for a vehicle and ranking a number of vehicles based on wear.

Referring now to FIG. 3, a flowchart illustrating method 300 of computing wear for a vehicle and ranking a number of vehicles based on wear is shown, according to an exemplary embodiment. In various embodiments, vehicle 200 performs one or more steps of method 300. Additionally or alternatively, one or more external systems, such as a cloud-based data processing system, may perform one or more steps of method 300. For example, vehicle 200 may compute (e.g., via the TCM ECU of control system 230, etc.) wear associated with vehicle 200 and a vehicle data analysis system may rank a number of vehicles based on the computed wear associated with each vehicle.

The strain-based wear and vibration-based wear accumulating on the component may be computed separately but in parallel. In both cases, a transfer function may be applied first to the incoming vibration sensor signals. A temporal rainflow matrix may be integrated into a constantly updating accrual rainflow matrix which is used to compute the final wear amounts. The wear may be compared against a threshold and a component having accumulated wear that exceeds the acceptable threshold may be identified for servicing.

At step 302, control system 230 may receive vibration sensor signals. For example, control system 230 may receive vibration sensor signals from vibration sensors 240 positioned on specific portions of vehicle 200. In various embodiments, the vibration sensor signals include timeseries data. At step 304, control system 230 may apply a first transfer function to determine strain at a component of vehicle 200. For example, control system 230 may retrieve a transfer function corresponding to a specific vibration sensor 240 and component pair from a lookup table and may apply the transfer function to signals from the specific vibration sensor 240 to determine strain at the component.

Speaking generally, control system 230 may utilize one or more transfer functions that model a characteristic of vehicle 200 at a second location based on a characteristic of vehicle 200 at a first location. For example, control system 230 may utilize a first transfer function that models force on a portion of a component of vehicle 200 based on a measurement of vibrations at a wheel of vehicle 200. As another example, control system 230 may utilize a second transfer function that models vibration at a wheel strut based on a measurement of vibrations at a component of vehicle 200. In various embodiments, the one or more transfer functions are determined based on operational measurements (e.g., measurements describing a relationship between vibration and strain, etc.).

In various embodiments, determining strain includes computing a measurement of vibration at the component based on the vibration sensor signals. Additionally or alternatively, determining strain may include computing a measurement of force at the component based on the vibration sensor signals. For example, control system 230 may compute a measurement of vibration at a location on a component of vehicle 200 by applying a first transfer function to sensor signals from a vibration sensor positioned on a wheel of vehicle 200 and may compute a measurement of force at the location on the component by applying a second transfer function to the measurement of vibration at the location.

At step 306, control system 230 may compute a temporal rainflow matrix to assess temporal wear on a component due to component strain. For example, control system 230 may compute a number of fatigue cycles associated with a spring damper based on timeseries data describing force on the spring damper. In various embodiments, the temporal rainflow matrix is associated with a time period. For example, the temporal rainflow matrix may represent an accumulation of fatigue cycles associated with a component over a 24-hour period. It should be understood that a different period may be used (e.g., 15 seconds, 1 hour, whenever connected to the Internet, etc.). In various embodiments, the temporal rainflow matrix is an assembly of a number of fatigue cycles, an amplitude associated with the fatigue cycles, and/or a frequency of the fatigue cycles.

At step 308, control system 230 may compute an accrued rainflow matrix to determine strain-based wear on the component due to component strain. For example, control system 230 may compute an accrued number of fatigue cycles associated with a component of vehicle 200 over a lifetime of the component. In some embodiments, step 308 includes querying an external system, such as a vehicle data analysis system, to retrieve a first measurement of fatigue cycles associated with a first time period and adding a second measurement of fatigue cycles associated with a second time period to determine the strain-based wear. Additionally or alternatively, vehicle 200 may store a running count of fatigue cycles associated with one or more components. In various embodiments, the strain-based wear includes an aggregate number of fatigue cycles and an amplitude associated with the fatigue cycles corresponding to the component. In some embodiments, control system 230 compares the aggregate number of fatigue cycles and the amplitude associated with the fatigue cycles to a value associated with component failure to determine a percentage of lifetime remaining associated with the component. In some embodiments, the value associated with component failure is determined experimentally (e.g., via coupon testing, etc.).

At step 310, control system 230 may apply a second transfer function to determine vibrations at the component. For example, control system 230 may retrieve a transfer function corresponding to a specific vibration sensor 240 and component pair from a lookup table and may apply the transfer function to signals from the specific vibration sensor 240 to determine vibrations at the component. At step 312, control system 230 may compute a temporal rainflow matrix to assess temporal wear on the component due to component vibration. For example, control system 230 may compute a number of fatigue cycles associated with the component and an amplitude of the fatigue cycles based on the vibration at the component.

At step 314, control system 230 may compute an accrued rainflow matrix to determine vibration-based wear on the component due to component vibration. For example, control system 230 may sum a number of fatigue cycles associated with a component that were accumulated over a 24-hour period with a number of fatigue cycles associated with the component accumulated before the 24-hour period. In embodiments where vehicle 200 is an electric vehicle, step 316 may occur in response to control system 230 sensing that vehicle 200 has been connected to a charger. In some embodiments, control system 230 compares the aggregate number of fatigue cycles and the amplitude associated with the fatigue cycles to a value associated with component failure to determine a percentage of lifetime remaining associated with the component.

At step 318, control system 230 may compare the strain-based wear to a threshold. For example, control system 230 may compare an aggregate number of fatigue cycles associated with the component over the lifetime of the component to a threshold to determine whether the aggregate number of fatigue cycles exceed the threshold. Additionally or alternatively, control system 230 may compare the vibration-based wear to a threshold. In various embodiments, control system 230 uses a first threshold for comparing strain-based wear and a second threshold for comparing vibration-based wear. In various embodiments, if the vibration-based wear and/or strain-based wear exceeds the threshold, control system 230 generates an alert. The alert may trigger additional actions such as automatically scheduling a service appointment to service the component. In some embodiments, the first and second thresholds are determined experimentally (e.g., via coupon testing, etc.). Additionally or alternatively, the first and second thresholds may be determined using an AI model trained with historical service data.

At step 318, a vehicle data analysis system may rank vehicles based on wear. For example, the vehicle data analysis system may query a ledger containing one or more vehicle health metrics associated with a fleet of vehicles and may rank the vehicles in the fleet from most wear to least wear. In some embodiments, step 318 includes aggregating one or more wear metrics associated with a number of components of a vehicle into a single wear metric representing the overall vehicle. For example, a vehicle data analysis system may track wear associated with 100 vehicle components of a vehicle and may generate an average wear metric for the vehicle by computing an average of the 100 component wear metrics. In various embodiments, the vehicle data analysis system ranks the vehicles based on the average wear metric. Additionally or alternatively, the vehicle data analysis system may rank the vehicles based on individual component wear metrics.

Figure 4:
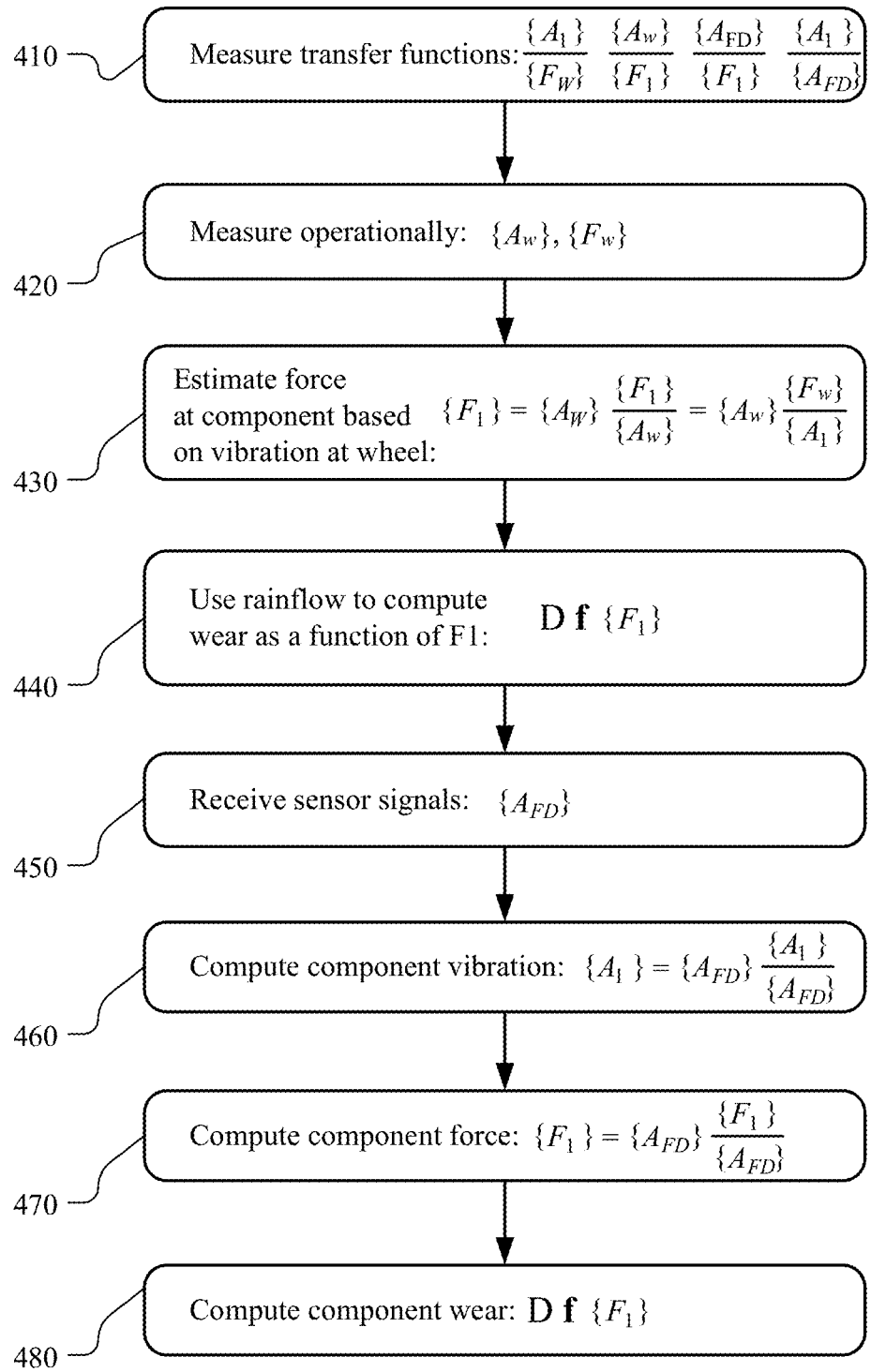
FIG. 4 illustrates a method of computing component wear for a vehicle.

FIG. 4 illustrates a method 400 of computing component wear for a vehicle, according to an exemplary embodiment. Method 400 may be used to perform background monitoring of a component of vehicle 200. A vibration sensor may be coupled to the component. An output of a first vibration sensor may be represented by $\{AFD\}$. An output of a second vibration sensor 406 may be represented by $\{AW\}$. In some embodiments, a force corresponding to a wheel is calculated based on the output a vibration sensor. The force corresponding to the wheel may be represented by $\{FW\}$. The vibration sensors may be used to monitor a portion of a component for wear. For example, method 400 may be used to identify a crack at a portion of a component. The force and vibration at the portion of the component may be represented as $\{F1\}$ and $\{A1\}$ respectively.

At step 410, one or more transfer functions may be measured. A transfer function may describe a relationship between vibration at a first location (e.g., the location of a first vibration sensor, etc.) and vibration at a second location (e.g., the location of the portion of the component, etc.). However it should be understood that transfer functions representing other relationships are possible. For example, a transfer function may describe a relationship between vibration at a first location and force at a second location. The one or more transfer functions may be represented as:

$$\frac{\{A_1\}}{\{A_W\}} \frac{\{A_W\}}{\{F_1\}} \frac{\{A_{FD}\}}{\{F_1\}} \frac{\{A_1\}}{\{A_{FD}\}}$$

At step 420, an output of a vibration sensor may be measured. In some embodiments, step 420 includes calculating a force at a wheel based on vibration measurements at the wheel. At step 430, an estimate of force at a portion of a component may be estimated based on vibration at the wheel. For example, control system 230 may compute an estimate of force at a portion of a component by applying a transfer function to vibration data from a vibration sensor. In some embodiments, an output of step 430 includes time-series force data corresponding to force experienced by the portion of the component over time. In various embodiments, step 430 includes implementing the function:

$$\{F_1\} = \{A_W\}\frac{\{F_1\}}{\{A_W\}} = \{A_W\}\frac{\{F_W\}}{\{A_1\}}$$

At step 440, control system 230 may compute wear associated with the portion of the component using the force computed in step 430. In various embodiments, step 440 includes calculating a rainflow matrix based on the force. For example, control system 230 may sum a number of fatigue cycles generated from timeseries force data. In some embodiments, wear is expressed as a percentage of a threshold number of fatigue cycles. In various embodiments, control system 230 performs steps 440-480. At step 450, control system 230 may receive vibration data from a vibration sensor. At step 460, control system 230 may compute component vibration using the vibration data from the vibration sensor. In various embodiments, step 460 includes applying a transfer function to the vibration data from the vibration sensor. For example, control system 230 may implement the function:

$$\{A_1\} = \{A_{FD}\}\frac{\{A_1\}}{\{A_{FD}\}}$$

At step 470, control system 230 may compute a component force for the portion of the component using the vibration data from the vibration sensors. In various embodiments, step 470 includes applying a transfer function to the vibration data from a vibration sensor. For example, control system 230 may implement the function:

$$\{F_1\} = \{A_{FD}\}\frac{\{F_1\}}{\{A_{FD}\}}$$

At step 480, control system 230 may compute component wear based on the component force computed in step 470. In various embodiments, step 480 includes calculating a rainflow matrix based on the force. For example, control system 230 may sum a number of fatigue cycles generated from timeseries force data. In some embodiments, wear is expressed as a percentage of a threshold number of fatigue cycles. In some embodiments, step 480 includes combining the measure of wear associated with the portion of the component generated from vibration data from a first vibration sensor with the measure of wear associated with the portion of the component generated from vibration data from a second vibration sensor. For example, control system 230 may compute an average wear using the two measurements of wear. In some embodiments, steps 420-440 are performed in parallel with steps 450-480.

Figure 5:
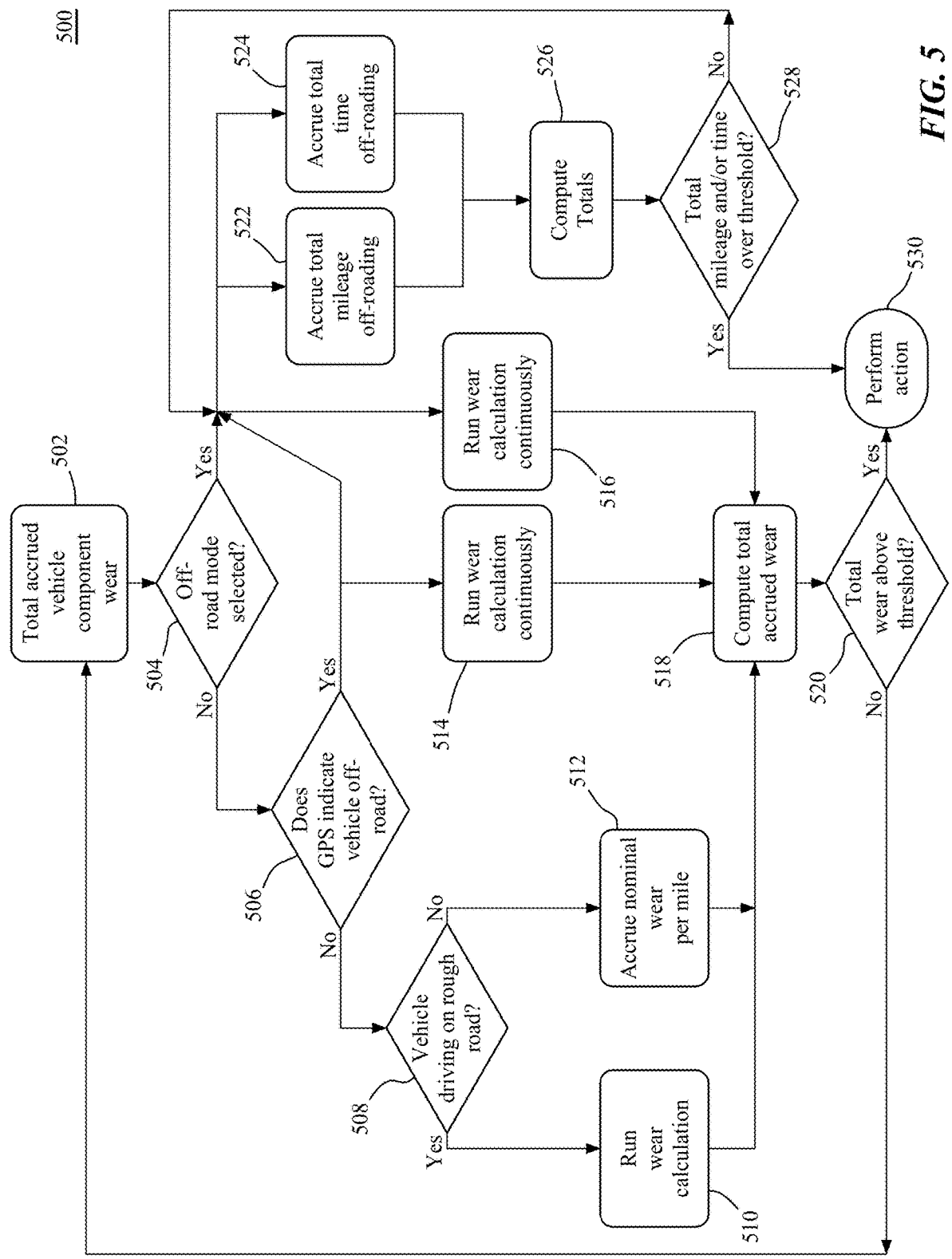
FIG. 5 is a flowchart illustrating a method of monitoring wear for a vehicle.

FIG. 5 is a flowchart illustrating a method 500 of monitoring wear for a vehicle. For example, control system 230 may implement method 500 to continuously monitor wear associated with one or more components of vehicle 200. Starting with the total accrued component wear calculated from the above description, a determination may be made to determine whether the vehicle is currently in an off-road environment. Using the off-road mode of the vehicle as an initial indicator, a vehicle in this mode may result in both a wear calculation and an off-road mileage and time calculation. These accrued totals may then be compared against thresholds representing acceptable threshold values and exceeding either threshold may result in the trigger of a diagnostic trouble code (DTC) to notify the customer of a potential problem and a need for service. On the other hand, if the off-road mode of the vehicle is not enabled, the vehicle's GPS may be utilized to determine the road conditions the vehicle is currently subjected to. Indications of off-road conditions may result in actual wear calculations, whereas only nominal wear calculations are performed otherwise. In both conditions, the computed total wear is subsequently compared against the threshold and may also in turn result in the trigger of a DTC.

At step 504, control system 230 may determine whether an off-road mode is selected. For example, the TCM ECU may query the CGM ECU to determine what mode vehicle 200 is in. If the off-road mode is selected (yes), method 500 may continue with steps 516, 522, and 524. At step 516, control system 230 may run wear calculations continuously. For example, control system 230 may execute a method of monitoring component wear as described in detail above. At step 518, control system 230 may compute total accrued wear based on the wear calculation from step 516. For example, control system 230 may compute a rainflow matrix representing a total number of accrued fatigue cycles associated with a vehicle and/or a vehicle component over its lifetime. At step 520, control system 230 may compare the total accrued wear from step 518 with a threshold. If the total accrued wear is less than the threshold (no), then control system 230 may save the total accrued component wear (step 502). If the total accrued wear is greater than the threshold (yes), then control system 230 may perform an action (step 530). The action may include automatically scheduling a service appointment to service a component determined to have exceeded a threshold level of wear. Additionally or alternatively, the action may include alerting service personnel that the vehicle requires service.

At step 522, control system 230 may accrue total mileage off-roading. For example, control system 230 may update a counter to determine the number of miles driven in the off-road mode. At step 524, control system 230 may accrue total time off-roading. For example, control system 230 may update a timer to determine the total time spent in the off-road mode. At step 526, control system 230 may compute totals. For example, control system 230 may compute a total amount of mileage driven off-road and/or a total amount of time spent off-roading. At step 528, control system 230 may compare the total mileage and/or the total time to a threshold. In some embodiments, control system 230 compares the total mileage to a first threshold and the total time to a second threshold. If the total mileage and/or the total time are greater than a threshold (yes), then control system 230 may perform an action (step 530). For example, control system 230 may alert a user that a service appointment is recommended based on the total number of miles driven off-road. If the total mileage and/or total time are less than a threshold (no), then control system 230 may continue monitoring wear, mileage, and/or time associated with off-roading.

If the off-road mode is not selected (no), method 500 may continue with step 506. At step 506, control system 230 may determine whether GPS data indicates the vehicle is off-road. For example, control system 230 may compare a GPS location of vehicle 200 to a map of known roads to determine whether vehicle 200 is on one of the known roads. If the GPS data indicates that the vehicle is off-road (yes), then control system 230 may perform the off-road monitoring described above (e.g., steps 516, 522, and 524). If the GPS data indicates that the vehicle is not off-road (no), then control system 230 may determine whether the vehicle is driving on a rough road (step 508). For example, control system 230 may compare an amplitude of vibration data signals to a threshold and determine that the vehicle is driving on a rough road if the amplitude of the vibration data signals exceed the threshold a threshold number of times during a period.

If control system 230 determines that the vehicle is driving on a rough road (yes), then control system 230 may run a wear calculation continuously (step 510). Running the wear calculation may include computing a rainflow matrix to determine an aggregate number of fatigue cycles based on vibration data as described in detail above. If control system 230 determines that the vehicle is not driving on a rough road (no), then the control system may accrue nominal wear per mile (step 512). For example, control system 230 may add a scalar value to a rainflow matrix for each mile traveled by the vehicle. In various embodiments, control system 230 performs step 518 after steps 510 and 512.

Figure 6:
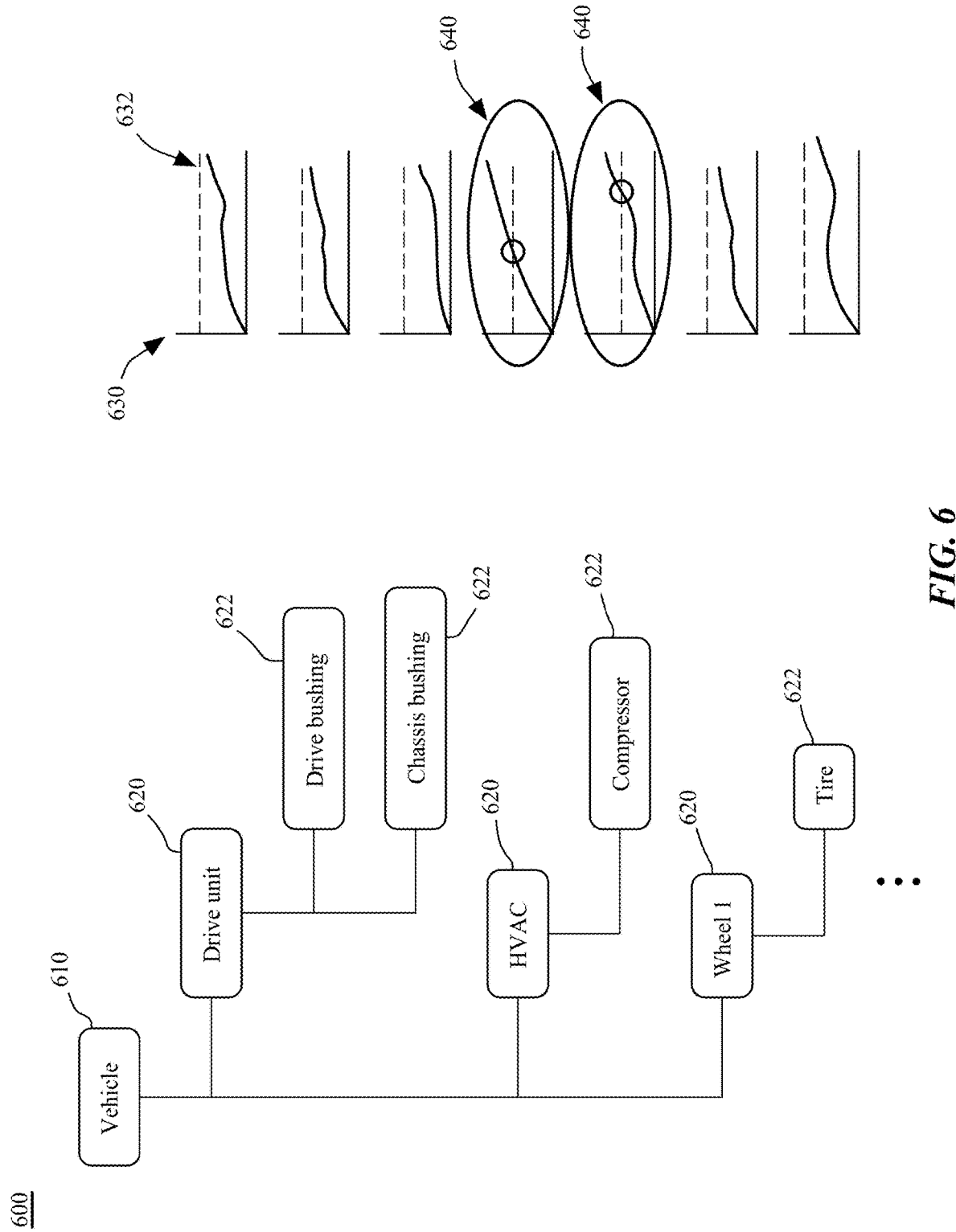
FIG. 6 illustrates an example of monitoring component wear for a vehicle and identifying a component in need of service.

Turning now to FIG. 6, an example of monitoring component wear for a vehicle and identifying a component in need of service is shown, according to an exemplary embodiment. In various embodiments, a vehicle data analysis system and/or on-board module may maintain data structure 600 (e.g., a ledger, etc.) for a number of vehicles. Data structure 600 may be a digital representation of each vehicle and/or the components of each vehicle. For example, data structure 600 may include an entry for vehicle 610 having components 620 and sub-components 622. In various embodiments, the vehicle data analysis system may continuously monitor wear associated with each of components 620 and/or subcomponents 622. For example, the vehicle data analysis system may apply a transfer function to vibration data to determine a measure of strain at each component 620 and may compute a rainflow matrix using the measure of strain to determine wear associated with each component 620.

In various embodiments, data structure 600 includes wear measurements 630. Wear measurements 630 may represent the results of a rainflow matrix describing a number of accumulated fatigue cycles associated with each component 620 and/or subcomponent 622. In various embodiments, components 620 and/or subcomponents 622 may accumulate wear at different rates. In some embodiments, the vehicle data analysis system may compare wear measurements 630 to threshold 632. In various embodiments, if a wear measurement associated with a component exceeds the threshold, the vehicle data analysis system may perform an action. For example, the vehicle data analysis system may automatically schedule a service appointment to service the component. In some embodiments, the vehicle data analysis system may identify components in need of repair 640 based on comparing wear measurements 630 to thresholds 632. For example, the vehicle data analysis system may identify components in need of repair 640 based on wear measurements 630 exceeding thresholds 632. Additionally or alternatively, the vehicle data analysis system may identify components in need of repair 640 based on a rate of wear accumulation. For example, if a first component starts to accumulate wear quickly (e.g., accelerated wear) then the vehicle data analysis system may identify the first component (and/or a second component) as in need of repair. In various embodiments, thresholds 632 are unique to each component 620 and/or subcomponent 622. For example, a drive unit bushing may have a first threshold and a chassis bushing may have a second threshold. In various embodiments, wear measurements 630 may be aggregated to generate an overall wear metric for vehicle 610. Additionally or alternatively, wear measurements 630 corresponding to subcomponents 622 may be aggregated to generate an overall wear measurement for components 620. For example, a wear measurement for a drive unit may be computed as an average of wear measurements for subcomponents of the drive unit.

Figure 7:
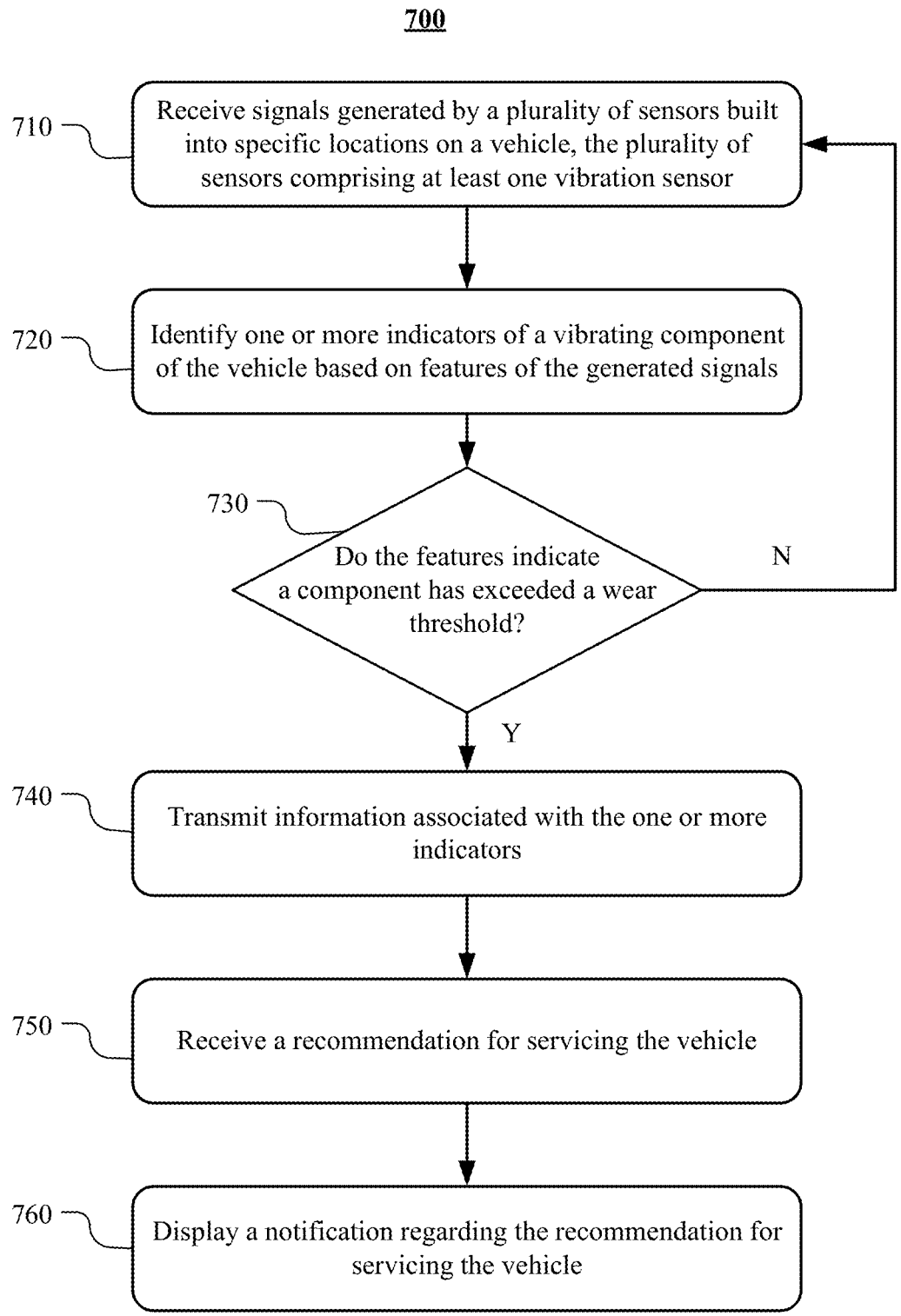
FIG. 7 is a flowchart illustrating a method of determining a maintenance schedule for a vehicle.

Turning now to FIG. 7, a flowchart illustrating a method 700 of determining a maintenance schedule for a vehicle is shown, according to an exemplary embodiment. In various embodiments, an on-board module of vehicle 200 performs method 700. For example, the TCM ECU may perform method 700. Additionally or alternatively, a cloud-based data processing system such as a vehicle data analysis system may perform one or more steps of method 700. Method 700 is described with reference to an on-board module of vehicle 200, however it should be understood that method 700 may be performed by any other data processing system.

At step 710, an on-board module may receive signals generated by a number of sensors built into specific locations on a vehicle. In various embodiments, the number of sensors include vibration sensors. For example, the on-board module may receive vibration data from a number of accelerometers positioned on a component of vehicle 200. In some embodiments, step 710 includes receiving microphone data. Additionally or alternatively, step 710 may include receiving signals describing an operation of vehicle 200. For example, the signals may include steering angle data, throttle/brake pedal apply data, wheel speed data, and/or drive unit speed/torque data.

At step 720, the on-board module may identify one or more indicators of a vibrating component of the vehicle based on features of the generated signals. For example, the on-board module may perform frequency analysis to identify a frequency signature corresponding to a vibrating component. As another example, the on-board module may compute a cepstrum of vibration data with respect to a rotational speed of a drive unit of vehicle 200 and may apply a peak picking filter to the cepstrum to identify a frequency related to a damaged bearing. In some embodiments, step 720 includes applying a transfer function to vibration data. Additionally or alternatively, step 720 may include computing a rainflow matrix using vibration data to generate a measurement of wear associated with a component.

At step 730 the on-board module may determine whether the features indicate a component has exceeded a wear threshold. For example, the on-board module may determine that a component has exceeded a wear threshold based on identifying a frequency signature from audio data associated with a damaged gear. In some embodiments, step 730 includes comparing a measurement of wear to a threshold as described above. If the features indicate that a component has not exceeded a wear threshold (no), then method 700 may continue with step 710. If the features indicate that a component has exceeded a wear threshold (yes), then method 700 may continue with step 740.

At step 740, the on-board module may transmit information associated with the one or more indicators. For example, the on-board module may transmit a wear measurement associated with a component of vehicle 200. As another example, the on-board module may transmit a portion of vibration data. In various embodiments, step 740 includes transmitting the information to a cloud-based data processing system. For example, step 740 may include transmitting microphone data and throttle pedal position data to a vehicle data analysis system.

At step 750, the on-board module may receive a recommendation for servicing the vehicle. For example, the on-board module may receive a recommendation to service a drive unit gear. In various embodiments, the recommendation is received from a cloud-based data processing system (e.g., a vehicle data analysis system). In various embodiments, the recommendation is based on a prediction related to the one or more indicators and is identified by a vehicle data analysis system using a ML model trained to predict component failures using historical vehicle service data. For example, a vehicle data analysis system may train a CNN autoencoder using historical vehicle service data and/or historical vibration data and may be executed using vibration data from a vehicle to identify a component of the vehicle in need of service. At step 760, the on-board module may display a notification regarding the recommendation for servicing the vehicle. For example, the on-board module may cause a display of vehicle 200 to display a notification informing a user that service is required and allowing the user to select from a number of available service appointments. In some embodiments, step 760 includes automatically scheduling a service appointment based on the recommendation from step 750.

Figure 8:
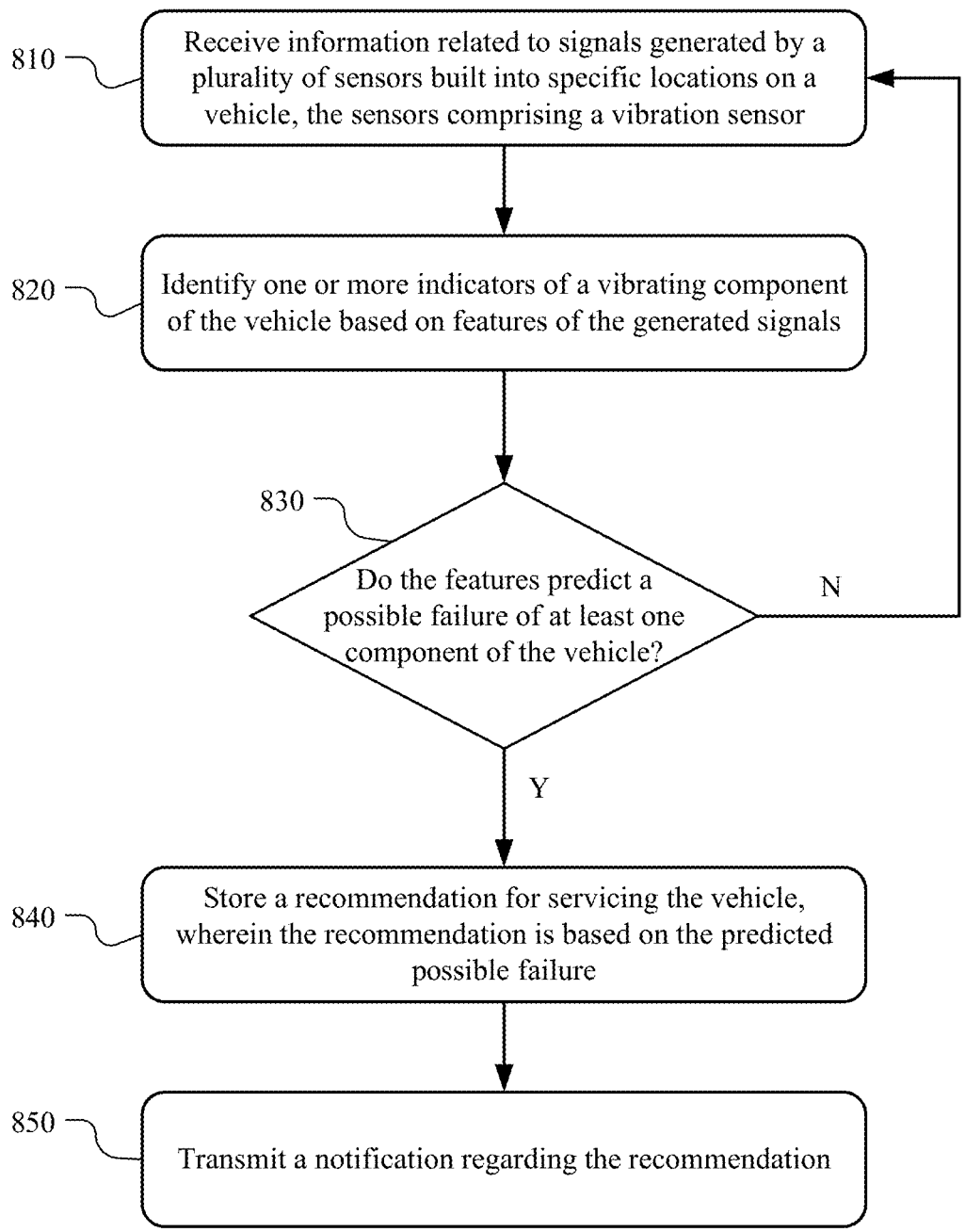
FIG. 8 is a flowchart illustrating a method of generating a recommendation for servicing a vehicle.

Turning now to FIG. 8, a flowchart illustrating a method 800 of generating a recommendation for servicing a vehicle is shown, according to an exemplary embodiment. In various embodiments, method 800 is performed by a cloud-based data processing system (e.g., a vehicle data analysis system, etc.). At step 810, the vehicle data analysis system may receive information related to signals generated by a plurality of sensors built into specific portions of a vehicle. In various embodiments, the sensors include a vibration sensor. For example, the vehicle data analysis system may receive vibration data from a number of accelerometers positioned on a component of vehicle 200. In some embodiments, step 810 includes receiving microphone data. Additionally or alternatively, step 810 may include receiving signals describing an operation of vehicle 200. For example, the signals may include steering angle data, throttle/brake pedal apply data, wheel speed data, and/or drive unit speed/torque data.

At step 820, the vehicle data analysis system may identify one or more indicators of a vibrating component of the vehicle based on features of the generated signals. In some embodiments, step 820 includes performing frequency analysis on the generated signals. As another example, the vehicle data analysis system may compute a cepstrum of vibration data with respect to a rotational speed of a drive unit of vehicle 200 and may apply a peak picking filter to the cepstrum to identify a frequency related to a damaged bearing. In some embodiments, step 820 includes analyzing the generated signals using an AI model trained using historical sensor data. In some embodiments, step 820 includes applying a transfer function to vibration data. Additionally or alternatively, step 820 may include computing a rainflow matrix using vibration data to generate a measurement of wear associated with a component.

At step 830, the vehicle data analysis system may determine whether the features predict a possible failure of at least one component of the vehicle. For example, the vehicle data analysis system may compare a measure of accumulated wear associated with a component to a threshold. If the features do not predict a possible failure (no), then method 800 may continue at step 810. If the features predict a possible failure (yes), then method 800 may continue at step 840. At step 840, the vehicle data analysis system may store a recommendation for servicing the vehicle. In some embodiments, the recommendation is based on the predicted possible failure. For example, the vehicle data analysis system may store a recommendation for replacing a bearing in a drive unit of a vehicle based on predicting that the bearing is likely to fail soon (e.g., because a measure of accumulated wear associated with the bearing has exceeded a threshold, etc.). In some embodiments, step 840 includes automatically scheduling a service appointment based on the recommendation.

At step 850, the vehicle data analysis system may transmit a notification regarding the recommendation. For example, the vehicle data analysis system may transmit a notification to the vehicle to notify a user that a component associated with the recommendation requires servicing. In some embodiments, step 850 includes receiving user input in response to the notification. For example, the notification may allow a user to select between a number of available service appointments and step 850 may include receiving a user selection of an available service appointment from the number of available service appointments.

Figure 9:
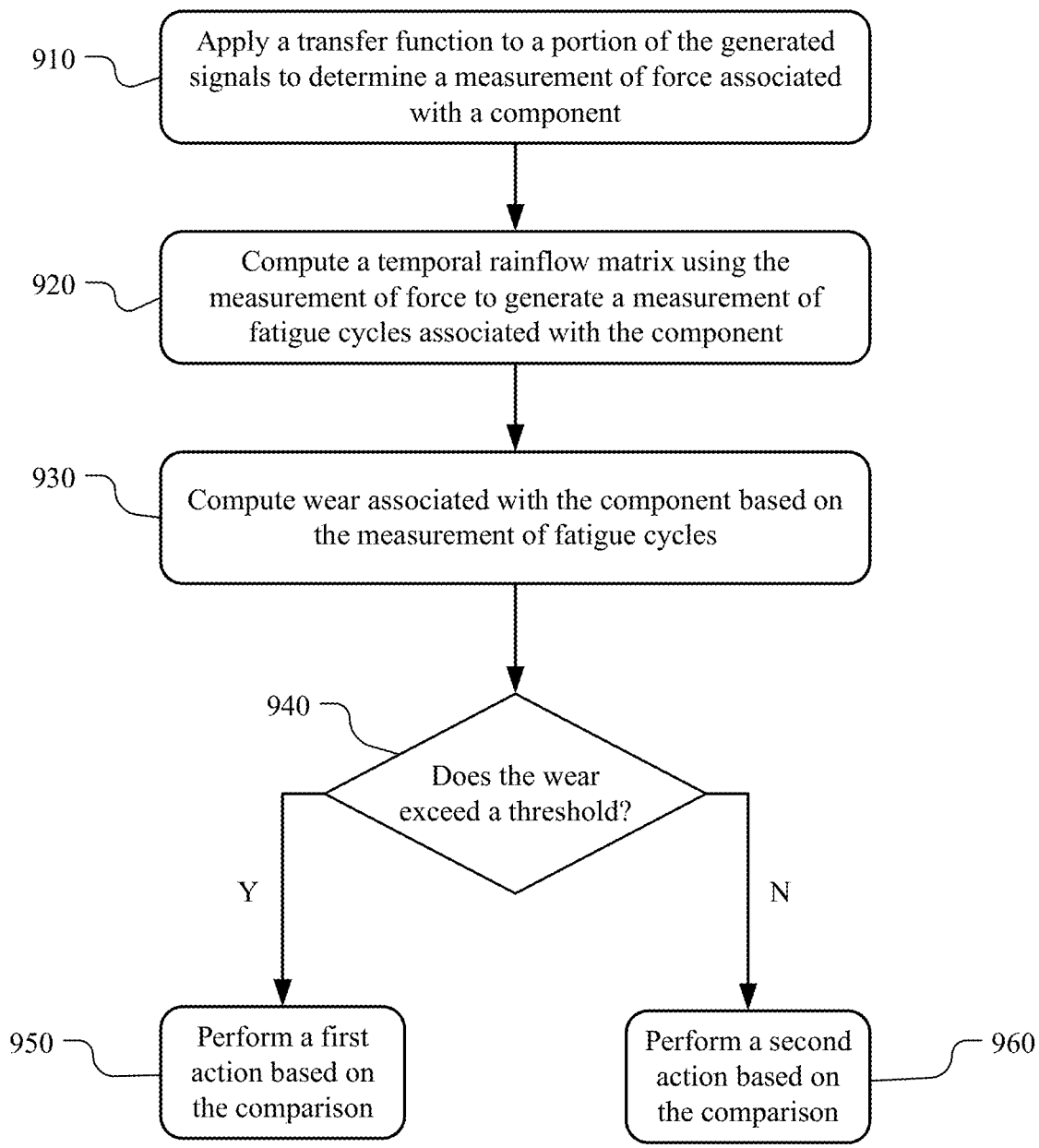
FIG. 9 is a flowchart illustrating a method of monitoring component wear for a vehicle.

Turning now to FIG. 9, a flowchart illustrating a method 900 of monitoring component wear for a vehicle is shown, according to an exemplary embodiment. In various embodiments, an on-board module of vehicle 200 performs method 900. Additionally or alternatively, a vehicle data analysis system may perform method 900. At step 910, the on-board module may apply a transfer function to a portion of the generated signals to determine a measurement of force associated with a component. For example, the on-board module may apply a transfer function as described above to convert vibration data measured at a first location associated with a vibration sensor into a measurement of force at a second location associated with the component.

At step 920, the on-board module may compute a temporal rainflow matrix using the measurement of force to generate a measurement of fatigue cycles associated with the component. For example, the on-board module may sum a number of fatigue cycles accumulated over a 24-hour period. In various embodiments, the temporal rainflow matrix includes a number of fatigue cycles, an amplitude associated with the fatigue cycles, and/or a frequency of the fatigue cycles. At step 930, the on-board module may compute wear associated with the component based on the measurement of fatigue cycles. In some embodiments, step 930 includes comparing the measurement of fatigue cycles to a threshold. In some embodiments, step 930 includes computing a measurement of aggregate wear associated with the component. For example, the on-board module may sum a number of fatigue cycles accumulated over a 24-hour period to a number of fatigue cycles accumulated prior to the 24-hour period. In some embodiments, wear is expressed as a percentage of a threshold value.

At step 940, the on-board module may determine whether the wear exceeds a threshold. For example, the on-board module may compare an aggregate number of fatigue cycles to a threshold number of fatigue cycles. Additionally or alternatively, the on-board module may compare an amplitude associated with a number of fatigue cycles to a threshold amplitude. If the wear exceeds the threshold (yes), then method 900 may continue with step 950. At step 950, the on-board module may perform a first action. For example, the on-board module may generate an alert to notify a user that the component requires servicing. Additionally or alternatively, the on-board module may automatically schedule a service appointment to have the component serviced. In some embodiments, the first action includes a number of actions. For example, in response to determining that a drive unit gear has exceeded a threshold level of wear, the on-board module may adjust operation of vehicle 200 to avoid using the gear and may prompt a user of vehicle 200 to schedule a service appointment to service the gear.

If the wear does not exceed the threshold (no), then method 900 may continue with step 960. At step 960, the on-board module may perform a second action. For example, the on-board module may transmit the measurement of wear to an external system (e.g., vehicle data analysis system, etc.). In some embodiments, step 960 is omitted. For example, the on-board module may continuously monitor wear associated with components of vehicle 200 and may only perform an action if a component wear exceeds a threshold.

Figure 10:
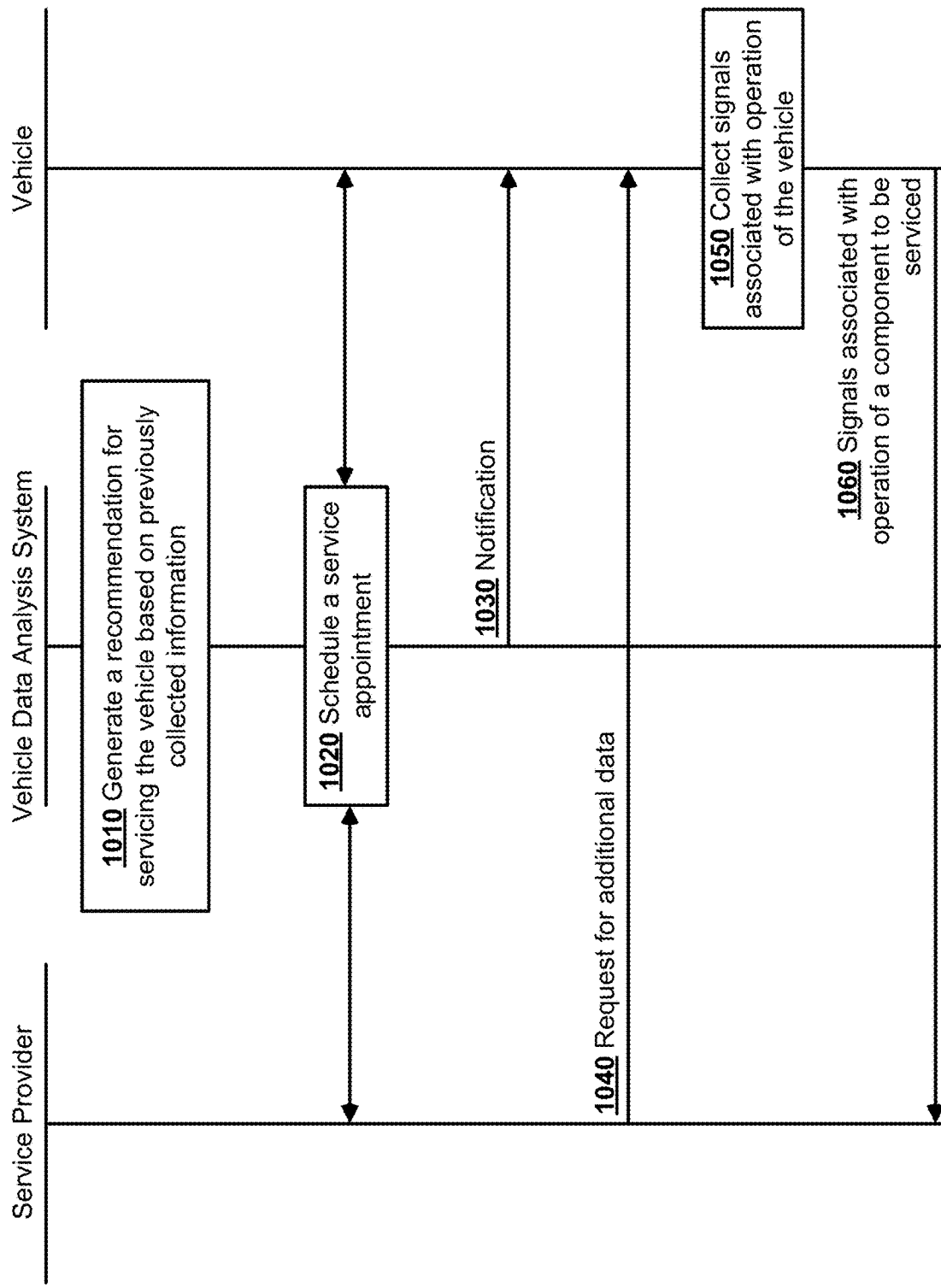
FIG. 10 illustrates an example of providing additional data associated with the operation of a vehicle to a service provider.

Turning now to FIG. 10, an example of providing additional data associated with the operation of a vehicle to a service provider is shown, according to an exemplary embodiment. In various embodiments, a service provider may request additional data to facilitate diagnosing a concern associated with a vehicle. For example, a user may schedule a service appointment for a vehicle component and the service provider may wish to collect additional data on the component before the user arrives at the service location. In various embodiments, in response to receiving a request for additional data, the on-board module of vehicle 200 may transmit sensor signals.

At step 1010, the vehicle data analysis system may generate a recommendation for servicing the vehicle based on previously collected information. For example, the vehicle data analysis system may generate a recommendation based on comparing a measurement of wear associated with a component to a threshold as described in detail above. At step 1020, a service appointment may be scheduled. Step 1020 may include interaction between the service provider, the vehicle data analysis system, and/or the vehicle. For example, the vehicle data analysis system may query a service provider for available service appointments, may transmit a list of the available service appointments to the vehicle, may receive a user selection of a service appointment from the list of available service appointments, and may transmit a request for a service appointment corresponding to the user selection to the service provider. In some embodiments, the vehicle data analysis system transmits information about a type of service requested and the service provider and/or other information associated with the service requested. For example, the vehicle data analysis system may transmit historical service information. As another example, the vehicle data analysis system may transmit sensor signals (or information derived therefrom) to the service provider to facilitate the service provider determining what service is required.

At step 1030, the vehicle data analysis system may transmit a notification to the vehicle. The notification may include information about the scheduled service appointment. For example, the notification may include a time, date, and location of the service appointment. Additionally or alternatively, the notification may include additional information such as an estimated time for completing the service and/or an estimated price. In some embodiments, a user of the vehicle can accept and/or decline the scheduled service appointment via the notification.

At step 1040, the service provider may transmit a request for additional data to the vehicle. For example, the vehicle data analysis system may schedule a service appointment related to excess noise associated with a drive unit of the vehicle and the service provider may request additional data such as vibration and/or sound data from the vehicle to facilitate determining what is causing the excess noise. In various embodiments, the request for additional data specifies a specific component (or subcomponent, etc.) that additional data is requested for. Additionally or alternatively, the request may specify a type of data requested (e.g., vibration data, sound data, etc.). For example, the request may specify that vibration data associated with a wheel bearing is requested.

At step 1050, the vehicle may collect signals associated with operation of the vehicle. In various embodiments, the vehicle collects the signals based on the request in step 1040. For example, if the request specified vibration data associated with a wheel bearing, then the vehicle may collect vibration data using a vibration sensor positioned on a component of the vehicle and may apply a transfer function to the vibration data to generate vibration data associated with the wheel bearing. In various embodiments, the vehicle collects the signals during operation of the vehicle (e.g., while the vehicle is moving). For example, the vehicle may collect the signals while the user is driving the vehicle to the service appointment. Additionally or alternatively, the vehicle may collect the signals while the vehicle is stationary. For example, if the service provider requests vibration data associated with an AC compressor of the vehicle, the vehicle may operate the AC compressor while the vehicle is parked to collect the vibration data, thereby reducing noise in the signal corresponding to the AC compressor vibrations.

At step 1060, the vehicle may transmit signals associated with operation of a component to be serviced. For example, the vehicle may transmit vibration sensor associated with an AC compressor of the vehicle to the service provider. In various embodiments, the vehicle transmits raw sensor data (e.g., timeseries accelerometer data, etc.) to the service provider. Additionally or alternatively, the vehicle may transmit information derived from the raw sensor data. For example, the vehicle may transmit vibration data associated with a component of the vehicle to the vehicle data analysis system which may analyze the data using a CNN autoencoder model and output a subcomponent of the component that is likely causing an issue, and the vehicle may transmit an indication of the subcomponent to the service provider. In various embodiments, the service provider uses the signals received in step 1060 to determine what service to perform. For example, the service provider may analyze raw sensor signals received as part of step 1060, may identify a specific gear that needs replacing based on the analysis, and may replace the gear (e.g., rather than deconstructing and manually inspecting a component/subcomponent, etc.).

Figure 11:
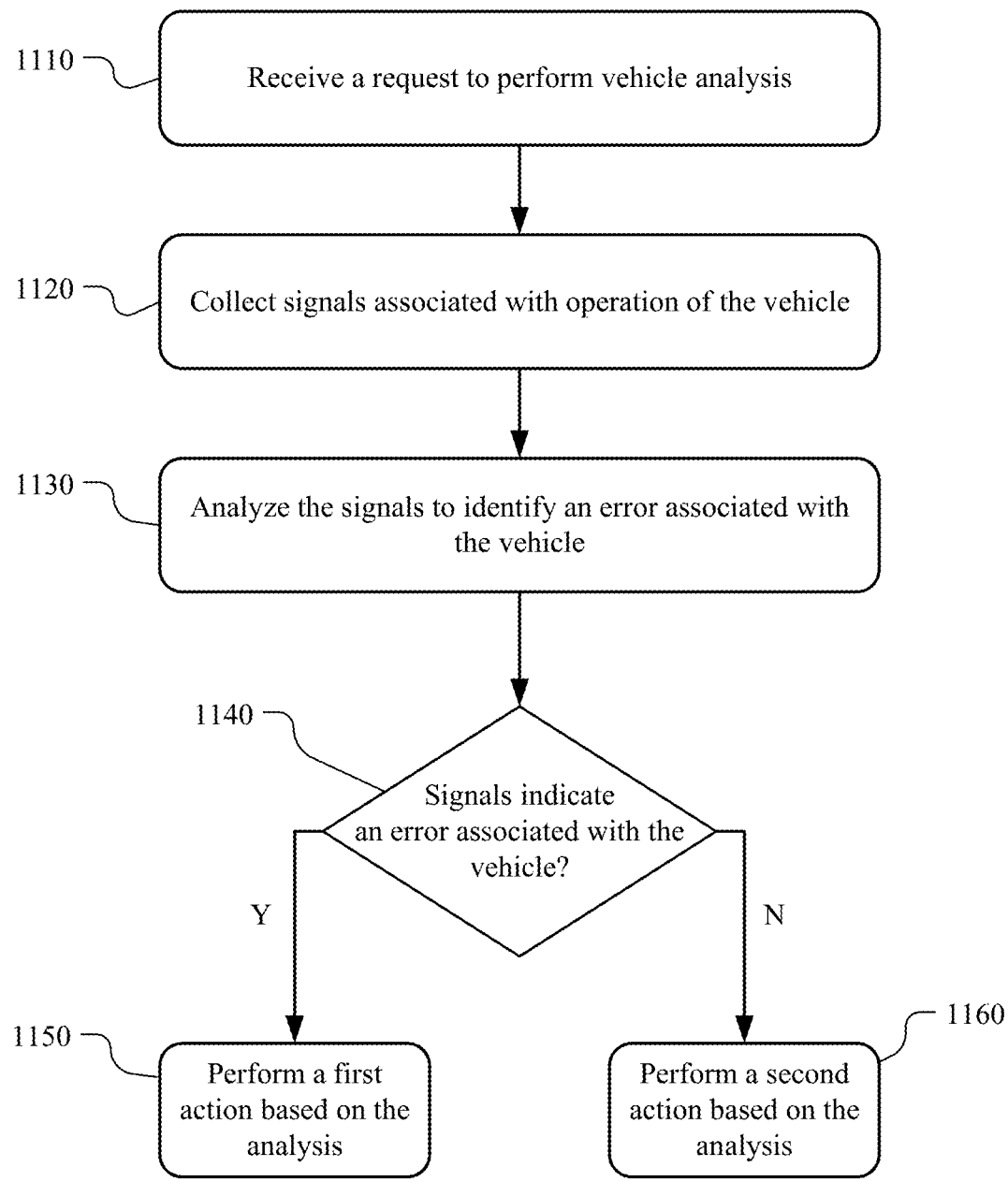
FIG. 11 is a flowchart illustrating a method of performing vehicle analysis.

Turning now to FIG. 11, a flowchart illustrating a method 1100 of performing vehicle analysis is shown, according to an exemplary embodiment. Method 1100 may be part of a vehicle audit performed after vehicle 200 is manufactured but before vehicle 200 enters a marketplace. For example, method 1100 may be performed as part of a quality assurance program to ensure vehicle 200 is in proper working order before being shipped to a dealership for sale. In various embodiments, an on-board module of vehicle 200 (e.g., the TCM ECU, etc.) performs method 1100.

At step 1110, the on-board module may receive a request to perform vehicle analysis. For example, a technician may select an audit option on a UI of vehicle 200. As another example, a quality assurance computing system may transmit a message to vehicle 200 to initiate vehicle analysis. At step 1120, the on-board module may collect signals associated with operation of the vehicle. For example, the on-board module may collect vibration data from a number of vibration sensors built into specific portions of vehicle 200. In various embodiments, step 1120 includes applying a transfer function to the collected signals. For example, the on-board module may collect vibration data from a vibration sensor positioned on a component of vehicle 200 and may apply a number of transfer functions to the vibration data to generate vibration data associated with a number of components of vehicle 200. In various embodiments, the signals are associated with a health of the vehicle/vehicle components (e.g., vibration data, microphone data, data describing torque applied to a component of the vehicle, etc.). In various embodiments, step 1120 includes collecting signals during different operating states of vehicle 200. For example, the on-board module may collect first signals while vehicle 200 is idling, second signals while vehicle 200 is traveling 35 miles-per-hour (MPH), and third signals while vehicle 200 is traveling 65 MPH.

At step 1030, the on-board module may analyze the signals to identify an error associated with the vehicle. For example, the on-board module may analyze the signals to identify any loose components of vehicle 200 (e.g., components not properly fastened to the vehicle, etc.). In some embodiments, step 1030 includes performing frequency analysis to determine whether a frequency signature associated with an error (e.g., a malfunctioning component/subcomponent, etc.) is present. Additionally or alternatively, step 1030 may include executing an AI model using the signals to identify any errors associated with the vehicle. For example, the on-board module may execute a CNN autoencoder model using vibration data from vehicle 200 to identify errors associated with vehicle 200. The errors may include brake squeal, excess wind noise (e.g., mirror whistle, etc.), excess road noise, HVAC health, an AC compressor fault, an out-of-balance rotor, drive unit bushing deterioration, chassis bushing deterioration, brake rotor thickness variation, excessive brake pad wear, wheel/tire imbalance, chassis damper leaks/failures, chassis misalignment, tire wear, gear/bearing failures (e.g., a wheel bearing failure, etc.), a halfshaft fracture, a CV joint fracture, and/or the like.

In various embodiments, step 1030 includes performing analysis specific to the signals collected. For example, the on-board module may perform static tests (e.g., checking for horn, wipers, windows, and/or seatbelt chime functionality, etc.) on first signals collected while vehicle 200 is idling and may perform dynamic tests (e.g., checking for an out-of-balance rotor, etc.) on second signals collected while vehicle 200 is traveling 35 MPH. It should be understood that while step 1130 is described in reference to the on-board module, other processing systems such as the vehicle data analysis system, may perform part or all of step 1130. For example, vehicle 200 may transmit the collected signals to the vehicle data analysis system and the vehicle data analysis system may apply an AI model trained using historical vehicle operation data to identify any errors associated with the vehicle.

At step 1040, the on-board module may determine whether the signals indicate an error associated with the vehicle is present. The on-board module may determine an error is present if the analysis in step 1130 identified an error (e.g., a loose component, an out-of-balance rotor, etc.). If the on-board module determines that an error is present (yes), then method 1100 may proceed with step 1150. At step 1150, the on-board module may perform a first action. For example, the on-board module may generate a notification for a technician that identifies the error. As another example, the on-board module may transmit a notification to an external system (e.g., a quality assurance computing system, etc.) identifying the error and including signals associated with the error (e.g., vibration data, etc.). In various embodiments, step 1150 is associated with failing a vehicle audit (e.g., the vehicle requires servicing before it can enter the marketplace, etc.) If the on-board module determines that an error is not present (no), then method 1100 may proceed with step 1160. At step 1160, the on-board module may perform a second action. For example, the on-board module may update a database to reflect that the vehicle has passed a vehicle audit. In some embodiments, step 1160 includes saving the signals to a database (e.g., for root cause analysis should a problem arise with the vehicle, etc.).

Figure 12:
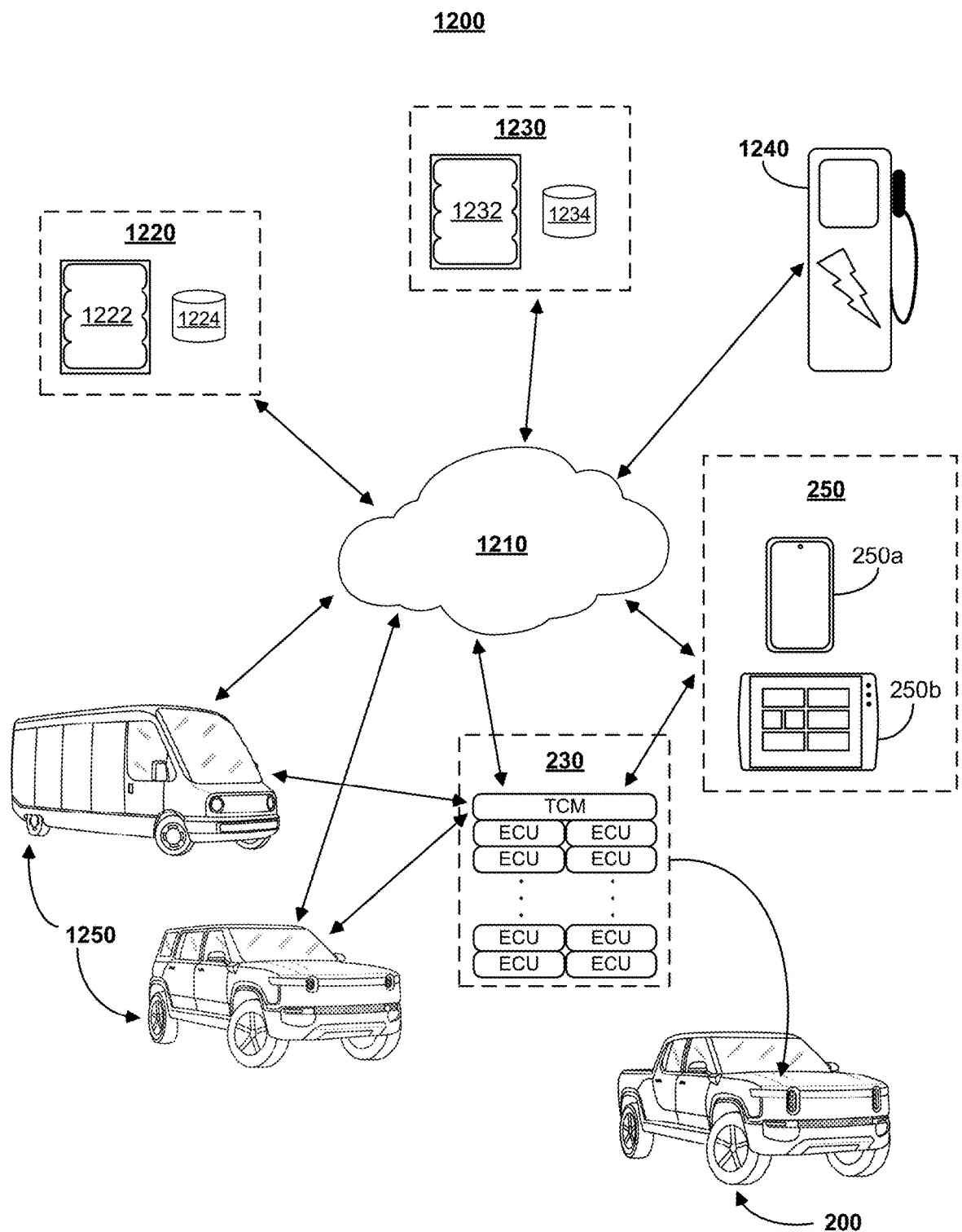
FIG. 12 illustrates an example network system including a connected vehicle.

FIG. 12 illustrates an example networked environment 1200. Computer system 1200 may include a connected vehicle 200 with a control system 230 that is capable of transmitting data to/from a network 1210. Network 1210 may also be connected to one or more computing servers 1220 (e.g., including compute units 1222 and storage units 1224) associated with a vehicle manufacturer, a vehicle service provider, a vehicle fleet operator, or a vehicle-charging facility provider. Network 1210 may also be connected to one or more third-party computing servers 1230 (e.g., including compute units 1232 and storage units 1234) associated with, for example, a smart accessory manufacturer, a group event organizer, service provider, or a governmental organization. Networked environment 1200 may include one or more landscape features 1240 (e.g., automated toll road sensors, smart road signs or road markers, automated toll gates, power dispensers at charging stations). Networked environment 1200 may also include other connected vehicles 1250 that may be capable of communicating with vehicle 200 through network 1210 and/or directly with vehicle 200 (e.g., by communicating with a TCM ECU of a control system 230 of vehicle 200 when connected vehicle 1250 is within range of a short-range communications network, such as Bluetooth). Networked environment 1200 may also include one or more computing devices 250 (e.g., smartphone 250*a*, a tablet computing device 250*b*, or a smart vehicle accessory) capable of communicating with network 1210 and/or directly with vehicle 200.

Networked environment 1200 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 200 to deduct a toll from a specified account and provides confirmation of the transaction). In particular embodiments, one or more elements of networked environment 1200 may include one or more computer systems, as described in further detail with respect to FIG. 13A. In particular embodiments, one or more elements of networked environment 1200 perform one or more steps of one or more methods described or illustrated herein. In particular embodiments, software running on one or more elements of networked environment 1200 may be controlled by a single entity to perform one or more steps of one or more methods described or illustrated herein or provide functionality described or illustrated herein.

Figures 13A, 13B:
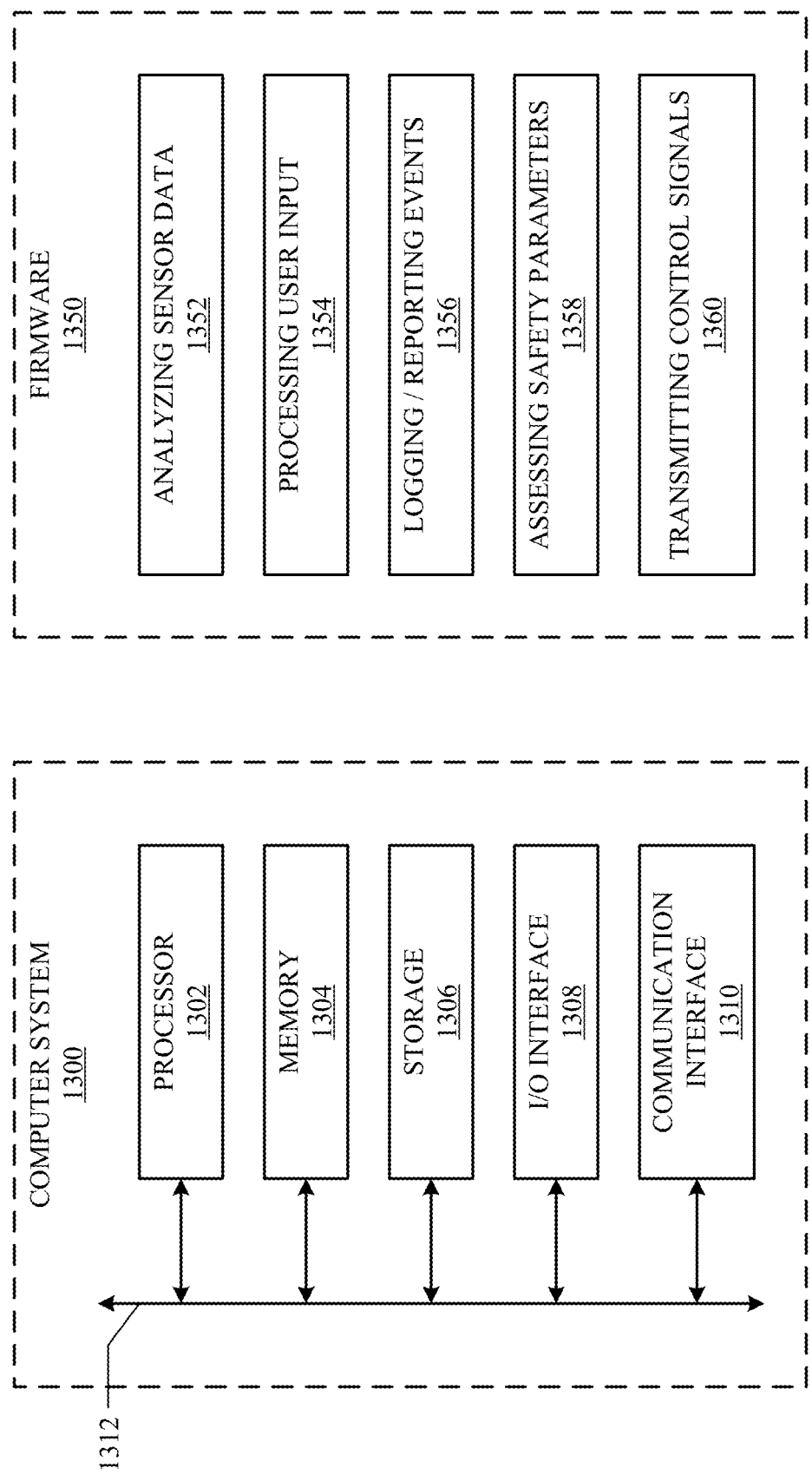
FIG. 13A is a schematic of an example computer system.
FIG. 13B illustrates example firmware for a vehicle ECU.

FIG. 13A illustrates an example computer system 1300. Computer system 1300 may include a processor 1302, memory 1304, storage 1306, an input/output (I/O) interface 1308, a communication interface 1310, and a bus 1312.

Although this disclosure describes one example computer system including specified components in a particular arrangement, this disclosure contemplates any suitable computer system with any suitable number of any suitable components in any suitable arrangement. As an example and not by way of limitation, computer system 1300 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1300 may include one or more computer systems 1300; be unitary or distributed, span multiple locations, machines, or data centers; or reside in a cloud, which may include one or more cloud components in one or more networks. Where appropriate, computer system(s) 1300 may perform, at different times or at different locations, in real time or in batch mode, one or more steps of one or more methods described or illustrated herein.

Processor 1302 (e.g., compute units 1222 and 1232) may include hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306 (e.g., storage units 1224 and 1234). Processor 1302 may include one or more internal caches for data, instructions, or addresses.

In particular embodiments, memory 1304 includes main memory for storing instructions for processor 1302 to execute or data for processor 1302 to operate on. In particular embodiments, one or more memory management units (MMUs) reside between processor 1302 and memory 1304 and facilitate accesses to memory 1304 requested by processor 1302. In particular embodiments, memory 1304 includes random access memory (RAM). This disclosure contemplates any suitable RAM.

In particular embodiments, storage 1306 includes mass storage for data or instructions. As an example and not by way of limitation, storage 1306 may include a removable disk drive, flash memory, an optical disc, a magneto-optical disc, magnetic tape, or a Universal Serial Bus (USB) drive or two or more of these. Storage 1306 may include removable or fixed media and may be internal or external to computer system 1300. Storage 1306 may include any suitable form of non-volatile, solid-state memory or read-only memory (ROM).

In particular embodiments, I/O interface 1308 includes hardware, software, or both, providing one or more interfaces for communication between computer system 1300 and one or more input and/or output (I/O) devices. Computer system 1300 may be communicably connected to one or more of these I/O devices, which may be incorporated into, plugged into, paired with, or otherwise communicably connected to vehicle 200 (e.g., through the TCM ECU). An input device may include any suitable device for converting volitional user input into digital signals that can be processed by computer system 1300, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 210 described above. An output device may include devices designed to receive digital signals from computer system 1300 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1308 for them. I/O interface 1308 may include one or more I/O interfaces 1308, where appropriate.

In particular embodiments, communication interface 1310 includes hardware, software, or both providing one or more interfaces for data communication between computer system 1300 and one or more other computer systems 1300 or one or more networks. Communication interface 1310 may include one or more interfaces to a controller area network (CAN) or to a local interconnect network (LIN). Communication interface 1310 may include one or more of a serial peripheral interface (SPI) or an isolated serial peripheral interface (isoSPI). In some embodiments, communication interface 1310 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1312 includes hardware, software, or both coupling components of computer system 1300 to each other. Bus 1312 may include any suitable bus, as well as one or more buses 1312, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 13B illustrates example firmware 1350 for a vehicle ECU 1300 as described with respect to control system 230. Firmware 1350 may include functions 1352 for analyzing sensor data based on signals received from sensors 210 or cameras 220 received through communication interface 1310. Firmware 1350 may include functions 1354 for processing user input (e.g., directly provided by a driver of or passenger in vehicle 200 or provided through a computing device 250) received through I/O interface 1308. Firmware 1350 may include functions 1356 for logging detected events (which may be stored in storage 1306 or uploaded to the cloud), as well as functions for reporting detected events (e.g., to a driver or passenger of the vehicle through an instrument display or interactive interface of the vehicle, or to a vehicle manufacturer, service provider, or third party through communication interface 1310). Firmware 1350 may include functions 1358 for assessing safety parameters (e.g., monitoring the temperature of a vehicle battery or the distance between vehicle 200 and nearby vehicles). Firmware 1350 may include functions 1360 for transmitting control signals to components of vehicle 200, including other vehicle ECUs 1300.

Particular embodiments may repeat one or more steps of the methods of FIGS. 3, 4, 5, 7, 8, 9, and/or 11, where appropriate. Although this disclosure describes and illustrates particular steps of the methods of FIGS. 3, 4, 5, 7, 8, 9, and/or 11 as occurring in a particular order, this disclosure contemplates any suitable steps of the methods of FIGS. 3, 4, 5, 7, 8, 9, and/or 11 occurring in any suitable order. Moreover, although this disclosure describes and illustrates example methods for (i) computing wear for a vehicle and ranking a number of vehicles, (ii) computing component wear, (iii) monitoring wear for a vehicle, (iv) monitoring component wear and identifying a component in need of service, (v) determining a maintenance schedule, (vi) generating a recommendation for servicing a vehicle, (vii) monitoring component wear, and (viii) performing vehicle analysis including the particular steps of the methods of FIGS. 3, 4, 5, 7, 8, 9, and/or 11, this disclosure contemplates any suitable method for the methods described above including any suitable steps, which may include all, some, or none of the steps of the methods of FIGS. 3, 4, 5, 7, 8, 9, and/or 11, where appropriate. Furthermore, although this disclosure describes and illustrates particular components, devices, or systems carrying out particular steps of the methods of FIGS. 3, 4, 5, 7, 8, 9, and/or 11, this disclosure contemplates any suitable combination of any suitable components, devices, or systems carrying out any suitable steps of the methods of FIGS. 3, 4, 5, 7, 8, 9, and/or 11.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for determining a maintenance schedule for a vehicle, the method comprising:
   receiving, by a control module of the vehicle, signals generated by a plurality of sensors built into specific locations on the vehicle, the plurality of sensors comprising at least one vibration sensor;
   identifying, by the control module of the vehicle, one or more indicators of a vibrating component of the vehicle based on features of the generated signals by:
      applying a first transfer function to at least a portion of the generated signals to determine a strain-based wear on the vibrating component due to component strain; and
      applying a second transfer function, different from the first transfer function, to at least a portion of the generated signals to determine a vibration-based wear on the vibrating component due to component vibration;
   transmitting, by a telecommunications module of the vehicle to a vehicle data analysis system, information associated with the one or more indicators;
   receiving, by the telecommunications module of the vehicle from the vehicle data analysis system, a recommendation for servicing the vehicle, wherein the recommendation is based on a prediction related to the one or more indicators and is identified by the vehicle data analysis system; and
   displaying, by a user interface module of the vehicle, a notification regarding the recommendation for servicing the vehicle.

2. The method of claim 1, wherein identifying the one or more indicators comprises determining, by the control module of the vehicle, a measurement of damage associated with the vibrating component.

3. The method of claim 2, wherein determining the measurement of damage comprises:
   determining, by the control module of the vehicle, a measurement of fatigue cycles associated with the vibrating component based on a measurement of force associated with the vibrating component.

4. The method of claim 3, wherein transmitting the information associated with the one or more indicators comprises transmitting the measurement of fatigue cycles associated with the vibrating component.

5. The method of claim 4, further comprising:
   aggregating, by the control module of the vehicle, the measurement of fatigue cycles associated with the vibrating component over time to generate an aggregate measurement of fatigue cycles associated with the vibrating component;
   comparing, by the control module of the vehicle, the aggregate measurement of fatigue cycles associated with the vibrating component to a threshold; and
   transmitting, by the telecommunications module to the vehicle data analysis system, information based on the comparison.

6. The method of claim 2, further comprising:
   tracking, by the control module of the vehicle, the measurement of damage associated with the vibrating component over time to generate a trend of damage associated with the vibrating component;
   identifying, by the control module of the vehicle, a change in a rate of mechanical wear associated with the vibrating component based on the trend; and
   transmitting, by the telecommunications module to the vehicle data analysis system, the information based on identifying the change in the rate of mechanical wear.

7. The method of claim 1, wherein identifying the one or more indicators comprises mapping a feature of a frequency domain representation of at least a portion of the signals to the vibrating component.

8. The method of claim 1, wherein displaying the notification comprises displaying an indication of the vibrating component.

9. The method of claim 1, wherein the plurality of sensors comprises a microphone and wherein receiving the signals comprises receiving microphone data.

10. The method of claim 9, wherein identifying the one or more indicators comprises mapping a feature of an audio signature of the microphone data to the vibrating component.

11. A vehicle system for determining a maintenance schedule for a vehicle comprising:
a vibration sensor built into a specific location on the vehicle;
a display; and
one or more computing devices comprising:
one or more non-transitory computer-readable storage media including instructions; and
one or more processors coupled to the one or more storage media, the one or more processors configured to execute the instructions to:
receive signals generated by the vibration sensor;
identify one or more indicators of a vibrating component of the vehicle based on features of the generated signals by:
applying a first transfer function to at least a portion of the generated signals to determine a strain-based wear on the vibrating component due to component strain; and
applying a second transfer function, different from the first transfer function, to at least a portion of the generated signals to determine a vibration-based wear on the vibrating component due to component vibration;
transmit to a vehicle data analysis system information associated with the one or more indicators;
receive from the vehicle data analysis system a recommendation for servicing the vehicle, wherein the recommendation is based on a prediction related to the one or more indicators and is identified by the vehicle data analysis system; and
display, via the display, a notification regarding the recommendation for servicing the vehicle.

12. The vehicle system of claim 11, wherein identifying the one or more indicators comprises determining a measurement of damage associated with the vibrating component.

13. The vehicle system of claim 12, wherein determining the measurement of damage comprises:
determining a measurement of fatigue cycles associated with the vibrating component based on a measurement of force associated with the vibrating component.

14. The vehicle system of claim 13, wherein transmitting the information associated with the one or more indicators comprises transmitting the measurement of fatigue cycles associated with the vibrating component.

15. The vehicle system of claim 14, wherein the instructions further cause the one or more processors to:
aggregate the measurement of fatigue cycles associated with the vibrating component over time to generate an aggregate measurement of fatigue cycles associated with the vibrating component;
compare the aggregate measurement of fatigue cycles associated with the vibrating component to a threshold; and
transmit to the vehicle data analysis system the information based on the comparison.

16. The vehicle system of claim 12, wherein the instructions further cause the one or more processors to:
track the measurement of damage associated with the vibrating component over time to generate a trend of damage associated with the vibrating component;
identify a change in a rate of mechanical wear associated with the vibrating component based on the trend; and
transmit to the vehicle data analysis system the information based on identifying the change in the rate of mechanical wear.

17. The vehicle system of claim 11, wherein identifying the one or more indicators comprises mapping a feature of a frequency domain representation of at least a portion of the signals to the vibrating component.

18. The vehicle system of claim 11, wherein displaying the notification comprises displaying an indication of the vibrating component.

19. The vehicle system of claim 11, further comprising a microphone and wherein receiving the signals comprises receiving microphone data and wherein identifying the one or more indicators comprises mapping a feature of an audio signature of the microphone data to the vibrating component.

20. A non-transitory computer-readable medium comprising instructions that, when executed by one or more processors of one or more computing devices, cause the one or more processors to:
receive signals generated by a vibration sensor built into a specific location on a vehicle;
identify one or more indicators of a vibrating component of the vehicle based on features of the generated signals by:
applying a first transfer function to at least a portion of the generated signals to determine a strain-based wear on the vibrating component due to component strain; and
applying a second transfer function, different from the first transfer function, to at least a portion of the generated signals to determine a vibration-based wear on the vibrating component due to component vibration;
transmit to a vehicle data analysis system information associated with the one or more indicators;
receive from the vehicle data analysis system a recommendation for servicing the vehicle, wherein the recommendation is based on a prediction related to the one or more indicators and is identified by the vehicle data analysis system; and
display, via a display of the vehicle, a notification regarding the recommendation for servicing the vehicle.

* * * * *